(12) United States Patent
Wiemers et al.

(10) Patent No.: US 8,663,464 B2
(45) Date of Patent: Mar. 4, 2014

(54) APPARATUS AND METHODS FOR ENHANCED ELECTROCOAGULATION PROCESSING USING MEMBRANE AERATION

(75) Inventors: Reginald A. Wiemers, Littleton, CO (US); Robert Kohlheb, Göttingen (DE); Peter H. Zahn, Littleton, CO (US)

(73) Assignee: Rockwater Resource, LLC

( * ) Notice: Subject to any disclaimer, the term of this patent is extended or adjusted under 35 U.S.C. 154(b) by 1050 days.

(21) Appl. No.: 12/452,773

(22) PCT Filed: Jul. 31, 2008

(86) PCT No.: PCT/US2008/009271
§ 371 (c)(1),
(2), (4) Date: Jan. 22, 2010

(87) PCT Pub. No.: WO2009/017801
PCT Pub. Date: Feb. 5, 2009

(65) Prior Publication Data
US 2010/0116752 A1 May 13, 2010

Related U.S. Application Data

(63) Continuation of application No. 11/888,512, filed on Aug. 1, 2007, now abandoned.

(51) Int. Cl.
*C02F 1/463* (2006.01)
(52) U.S. Cl.
USPC ..... 210/150; 210/703; 210/748.01; 210/153; 210/243; 210/321.6; 422/22; 422/24; 422/291; 422/292; 422/306; 204/155; 204/176; 204/157.63; 204/194

(58) Field of Classification Search
USPC ............ 210/748.01, 748.1, 748.17, 749, 750, 210/767, 768, 150, 151, 153, 170.05, 210/170.06, 198.1, 201, 243, 252, 260, 294, 210/295, 296, 307, 321.6; 422/22, 24, 291, 422/292, 306, 308; 204/155, 156, 157.44, 204/157.63, 164, 193, 194, 560, 660, 665, 204/666; 95/241, 242; 96/155, 176, 181, 96/189, 190, 194, 202, 234, 235, 240, 243, 96/267, 274; 700/28–31; 703/6, 7, 9, 12
See application file for complete search history.

(56) References Cited

U.S. PATENT DOCUMENTS

| | | | |
|---|---|---|---|
| 4,897,359 A | 1/1990 | Oakley et al. | |
| 4,923,679 A | 5/1990 | Fukasawa et al. | |
| 5,034,164 A | 7/1991 | Semmens | |
| 5,037,610 A | 8/1991 | Fukasawa et al. | |
| 5,271,814 A * | 12/1993 | Metzler | 205/743 |
| 5,277,176 A | 1/1994 | Habashi et al. | |
| 5,616,250 A | 4/1997 | Johnson et al. | |
| 5,674,433 A | 10/1997 | Semmens et al. | |
| 5,741,426 A * | 4/1998 | McCabe et al. | 210/707 |

(Continued)

*Primary Examiner* — Joseph Drodge
*Assistant Examiner* — Cameron J Allen
(74) *Attorney, Agent, or Firm* — Harold A. Burdick

(57) ABSTRACT

Apparatus and methods for enhanced electrocoagulation processing using enhanced membrane aeration are disclosed for effluent treatment. The apparatus has an enrichment means for establishing an ion rich air/gas stream and a membrane aerator for receiving the ionized air/gas stream and effluent to be treated. An ionized air/gas rich effluent feed stream flows out of the membrane aerator and is received at an electrocoagulation processing assembly for diffused ion enhanced electrocoagulation treatment.

18 Claims, 14 Drawing Sheets

(56) References Cited

U.S. PATENT DOCUMENTS

| | | | |
|---|---|---|---|
| 6,044,903 A * | 4/2000 | Heilman et al. | 165/263 |
| 6,136,186 A | 10/2000 | Gonzalez-Martin et al. | |
| 6,210,580 B1 * | 4/2001 | Wickins | 210/614 |
| 6,238,546 B1 * | 5/2001 | Knieper et al. | 205/742 |
| 6,325,916 B1 | 12/2001 | Lambert et al. | |
| 6,358,398 B1 | 3/2002 | Halldorson et al. | |
| 6,740,245 B2 | 5/2004 | Johnson | |
| 6,805,806 B2 | 10/2004 | Arnaud | |
| 7,410,588 B2 * | 8/2008 | Klemic | 210/670 |
| 2002/0020631 A1 * | 2/2002 | Gavrel et al. | 205/752 |
| 2004/0026335 A1 | 2/2004 | Fields | |
| 2005/0045534 A1 * | 3/2005 | Kin et al. | 210/96.1 |
| 2005/0274606 A1 * | 12/2005 | Powell | 204/228.2 |
| 2007/0068826 A1 * | 3/2007 | Morkovsky et al. | 205/742 |

* cited by examiner

APPARATUS AND METHODS FOR ENHANCED ELECTROCOAGULATION PROCESSING USING MEMBRANE AERATION

RELATED APPLICATION

This application is a continuation of U.S. patent application Ser. No. 11/888,512 filed Aug. 1, 2007 now abandoned by inventors including the inventors herein which application is pending on the filing date of this Application.

FIELD OF THE INVENTION

This invention relates to effluent treatment, and, more particularly, relates to electrocoagulation and membrane separation effluent treatment.

BACKGROUND OF THE INVENTION

Most industrial and municipal processes require water treatment facilities to treat effluents returned to the environment. Such facilities typically represent a significant investment by the business/community, and the performance of the facility (or failure thereof) can seriously impact ongoing operations financially and in terms of operational continuity.

Moreover, not all effluent treatment requires the same technologies. Industrial effluents (such as is found at coal bed methane facilities or oil production sites, for example) all have different particulate, pollutant and/or biomass content inherent to both the industrial processes as well as the particular water and soil conditions found at the site. Municipal requirements would likewise vary depending on desired end-of-pipe quality and use (and again depending on the feed water present at the site).

Electrocoagulation processes and membrane aeration treatment processes in wastewater treatment are well known. However, apparatus for performing such processes have heretofore not been used in tandem to any great affect, in any case required separate installations, extensive maintenance and investment to assure proper operations, and have required extensive floor space for their installation. Moreover, some heretofore known apparatus have been inefficiently designed for co-extensive utilization affecting both overall operation of the apparatus and plant as well as apparatus longevity.

Therefore, improvement of such apparatus could still be utilized. Moreover, improved treatment technologies adapted to this and other uses can always be utilized given the criticality of provision and maintenance of clean water.

SUMMARY OF THE INVENTION

This invention provides apparatus and methods for combining electrocoagulation and membrane aeration treatment stages in an effluent treatment array to provide enhanced electrocoagulation processing. The apparatus of this invention provides a unified installation reducing maintenance floor space requirements. The apparatus is designed for co-extensive utilization of components and efficient, durable operation.

The effluent treatment array utilizing enhanced membrane aeration for enhanced electrocoagulation treatment of effluent of this invention includes means for establishing an ion rich air/gas stream and a membrane aerator receiving the air/gas stream and effluent to be treated and providing an outflowing ionized air/gas rich effluent feed stream having the ionized air/gas diffused thereinto. An electrocoagulation processing assembly receives the ionized air/gas rich effluent feed stream for enhanced electrocoagulation treatment thereof and has an output therefrom.

The means for establishing an ion rich air/gas stream preferably includes a particle. The membrane aerator preferable includes an electrically charged dual coil mixing system for receiving the air/gas stream and effluent to be treated. The electrocoagulation processing assembly includes a primary reactor chamber and a floatation chamber integral with an upper part of the reactor chamber. A vacuum hood is attached at an upper portion of the electrocoagulation processing assembly for vacuum assisted removal of lighter than water contaminants ascending from the effluent.

The methods of this invention for utilizing enhanced membrane aeration for enhanced electrocoagulation treatment of wastewater include the steps of establishing an ion rich air/gas stream and diffusing the ion rich air/gas stream into a flow of the wastewater to provide an ionized air/gas rich effluent feed stream. The feed stream is exposed to primary electrocoagulation processing.

It is therefore an object of this invention to provide apparatus and methods for combining electrocoagulation and membrane aeration treatment stages in an effluent treatment array.

It is another object of this invention to provide apparatus and methods for combining electrocoagulation and membrane aeration treatment stages in a unified installation, reducing maintenance floor space requirements.

It is another object of this invention to provide apparatus and methods for electrocoagulation and membrane aeration treatment designed for co-extensive utilization of components and efficient, durable operation.

It is still another object of this invention to provide an effluent treatment array utilizing enhanced membrane aeration for enhanced electrocoagulation treatment of effluent including means for establishing an ion rich air/gas stream, a membrane aerator receiving the air/gas stream and effluent to be treated and providing an outflowing ionized air/gas rich effluent feed stream having the ionized air/gas diffused thereinto, and an electrocoagulation processing assembly receiving the ionized air/gas rich effluent feed stream for enhanced electrocoagulation treatment thereof and having an output therefrom.

It is yet another object of this invention to provide an effluent treatment array utilizing enhanced membrane aeration for enhanced electrocoagulation treatment of effluent that includes a particle emitter for establishing an ion rich air/gas stream, a membrane aerator including an electrically charged dual coil mixing system for receiving the air/gas stream and effluent to be treated and providing an outflowing ionized air/gas rich effluent feed stream having the ionized air/gas diffused thereinto, an electrocoagulation processing assembly including a primary reactor chamber and a floatation chamber integral with an upper part of the reactor chamber for receiving the ionized air/gas rich effluent feed stream for enhanced electrocoagulation treatment thereof and having an output therefrom, and a vacuum hood attached at the upper portion of the electrocoagulation processing assembly for vacuum assisted removal of lighter than water contaminants ascending from the effluent.

It is yet another object of this invention to provide a method utilizing enhanced membrane aeration for enhanced electrocoagulation treatment of wastewater that includes the steps of establishing an ion rich air/gas stream, diffusing the ion rich air/gas stream into a flow of the wastewater to provide an ionized air/gas rich effluent feed stream, and exposing the feed stream to primary electrocoagulation processing.

With these and other objects in view, which will become apparent to one skilled in the art as the description proceeds, this invention resides in the novel construction, combination, and arrangement of parts and methods substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
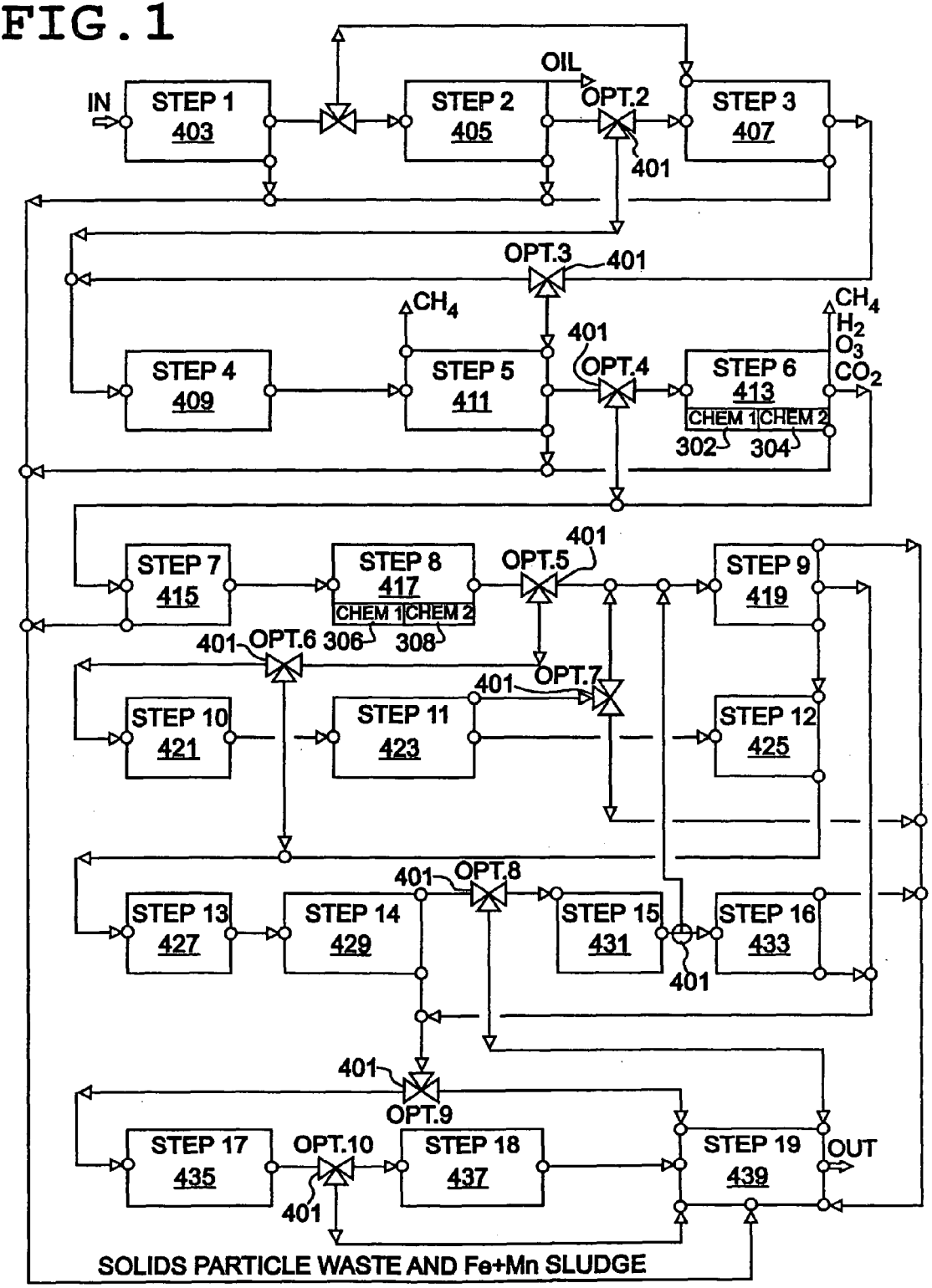
FIG. 1 is a block diagram illustrating phased functions of an effluent treatment regime.

As background, FIG. 1 shows steps of an effluent treatment regime. The option numbers located at three-way valves 401 refer to automated or override manual flow control options for different treatment regimes. Stage 403 (step 1) is a dual strainer receiving feed effluent and removing particulates down to about 500 μm (for example, the model 120 dual strainer produced by Plenty Products, Inc.). Stage 405 (step 2) provides oil separation from the feed flow utilizing a separator (for example, a Highland Tank & Mfg. Co. R-HTC Oil/Water Separator with Petro-Screen and parallel corrugated plate coalescers). Stage 407 (step 3) is an automatic backflush filter providing particle removal down to the 100 μm range or better (a TEKLEEN self cleaning bell filter setup with GB6 electric controller by Automatic Filters, Inc., or similar filter setups by Amiad Filtration Systems, could be utilized for example).

Stage 409 (step 4) provides inline direct feed effluent (water) heating. Feed water heating is required in many treatment settings due to seasonal operations, and further benefits many downpipe treatment options by breaking feed water alkalinity, enhancing $CH_4$ gas removal, ensuring proper membrane (where present) permeate flux for an overall constant permeate flow yield, and the like. Either of two types of inline heating systems may be utilized, as more fully detailed below.

Stage 411 (step 5) is a first suite of pre-treatment apparatus including eight apparatus (all eight are preferred, but fewer could be provided in some applications). These apparatus provide, as more fully detailed below, on-line diffusive effect (ODE) membrane aeration, fluid density reduction, modified vacuum tower or cascade series waterfall degassing, air stone degassing, modified venturi gas evacuation, fine filtration, lamella plate clarification, and sludge chamber concentration.

Stage 413 (step 6) is a second suite of pre-treatment apparatus including ten apparatus (all ten are preferred, but fewer could be provided in some applications). This stage provides pH adjustment (via an injection pump 302), chemical dosing (via an injection pump 304, ODE/IDI (inline diffusive ionization) membrane aeration, ionized air/gas treatment, electrocoagulation, dissolved air/gas flotation, vacuum introduced cyclone separation, vacuum degassing, lamella plate clarification, and sludge chamber concentration.

Stage 415 (step 7) provides a bag filter and/or belt filter assembly (for example, fabric filtration systems sold by SERFILCO) for filtration down to about the 1 μm range. Stage 417 (step 8) is a homogenizing and buffer tank with pH adjustment and chemical dosing (at injection pumps 306 and 308, respectively). Stage 419 (step 9) is the first of the primary, effluent polishing treatment array (stages 419 through 433, steps 9 through 16), and may include any of several membrane treatment apparatus in accord with this invention as more fully detailed hereinafter providing nanofiltration, and/or known ion-exchange treatment technology. Stage 419, as is apparent, is an option for up-concentrating effluent to increase overall flow yield.

Stage 421 (step 10) provides antifouling and antiscaling chemical treatment to prevent fouling and scaling of membranes by keeping low molecular weight components in solution (foremost of which are divalent and multivalent cations). Known variable speed tubing pumps could be utilized for insertion. Stage 423 (step 11) provides filtration for removal of low molecular weight components (Al, Fe, Mg and Mn, for example) and/or colloidals utilizing membrane treatment nanofiltration and/or ion-exchange treatment. Stage 425 (step 12) provides a buffer tank for step 14 for process flow control (for example a Snyder horizontal leg tank by Harrington). Stage 427 (step 13) provides antiscaling chemical treatment addressing monovalent and a few divalent cations and anions (Ba, Ca, Na, Sr, $CO_3F$, $HCO_3$, and $SO_4$ for example). Again, known variable speed tubing pumps could be utilized for insertion.

Stage 429 (step 14) addresses removal of low molecular weight components (salts, for example) utilizing reverse osmosis membrane treatment and/or ion-exchange treatment. Stage 431 (step 15) is a high pressure buffer tank providing flow control for step 9 and/or 16. Stage 433 (step 16) provides up-concentration of concentrate flow from stage 429 to further increase flow yield, and may utilize reverse osmosis membrane treatment, ion-exchange treatment and/or high efficiency electrodialysis technology (for example, a HEED assembly by EET Corporation), a hybrid process including both electrodialysis and reverse osmosis approaches.

Stage 435 (step 17) is a suite of four post-treatment apparatus as more fully detailed herein below, and including activated carbon filtration for gas absorption (Ametic filter chambers by Harrington, for example), sodium absorption ratio compensation, utilizing a dolomite filter for example, UV treatment (for example, an SP or SL series unit from Aquafine Corporation), and membrane aeration for $O_2$ saturation (preferably utilizing an ODE system in accord with yet another aspect of this invention).

Stage 437 (step 18) provides bio-monitoring utilizing a 10 gallon aquarium with the operating volume passing through either a sterilizer or other aquarium device to prevent in situ bio-contamination from waste and nutrients. The sterilizer or other device must match the maximum produced permeate flow of at the rate of approximately one gallon per minute for real time bio-monitoring. Since the sterilized water is typically being mixed with unsterilized water, it is not possible to completely purify it, but a sterilized percentage exceeding 99.9% is acceptable for the bio-monitoring step sensitivity. Stage 439 (step 19) conventionally provides waste collection and purified feed return.

Regarding the ion-exchange treatment alternative at stages 419, 423, 429, and 433 (steps 9, 11, 14 and 16), this process is a well known water treatment process for removing ions from solution by exchanging cations or anions between the dissolved phase and counter ions on a matrix such as organic zeolite, in which $Ca_2^+$ ions in solution displace $Na^+$ ions in the zeolite, montmorillonite (a colloidal bentonite clay) or synthetically produced organic resins, for example.

An organic ion exchange resin is composed of high molecular-weight polyelectrolytes that can exchange their mobile ions for ions of similar charge from the surrounding medium. Each resin has a distinct number of mobile sites that set the maximum quantity of exchanges per unit of resin. Ion exchange reactions are stoichiometric and reversible.

Commercially available ion-exchange treatment technology can be utilized alone as an alternative to the hereinafter detailed membrane treatment technology or may supplement specific membrane technology. The implementation of ion-exchange technology depends on the specific application and project economics (the less complex and labor-intensive state of the art ion exchange technology may be used as a single polishing step instead of membrane treatment where cost is a factor and desired treatment outcomes warrant the tradeoff).

In some settings, primarily depending on the intended use of the purified water, complete deionization (replacement of all cations by the hydrogen ion as well as replacement of all anions by the hydroxide ion) may be required. In such case, commercial cation- and anion-exchange technology will be employed as a polishing treatment step alone or in addition to membrane treatment (again depending on the end-of-pipe outcomes desired). For example, feed water with total dissolved solids of less than about 500 mg/L is ideally suited for ion exchange technology in combination with reverse osmosis membrane treatment. In other words, after membrane treatment at step 14 (429), the produced permeate is fed into a strongly acidic cation exchanger followed by a strongly basic anion exchanger (substituting for both steps 15 and 16). Such systems are commercially available from KINETICO, REMCO ENGINEERING and others.

Ongoing testing at various junctures in the staged processing of feed water is input into the system to gauge effectiveness of effluent treatment stages selected. If treatment reporting is unfavorable, the treatment model may be revised in accord with testing, or treatment parameters may be changed and the process restarted. If treatment reporting is favorable, the selected model and stages are upscaled to commercial plant proportions, and plant design, plant costs and/or treatment cost outputs are reported. If the report is acceptable, it is finalized. If not acceptable (for economic or other reasons), model revision or parameter changes may be undertaken.

Figure 2:
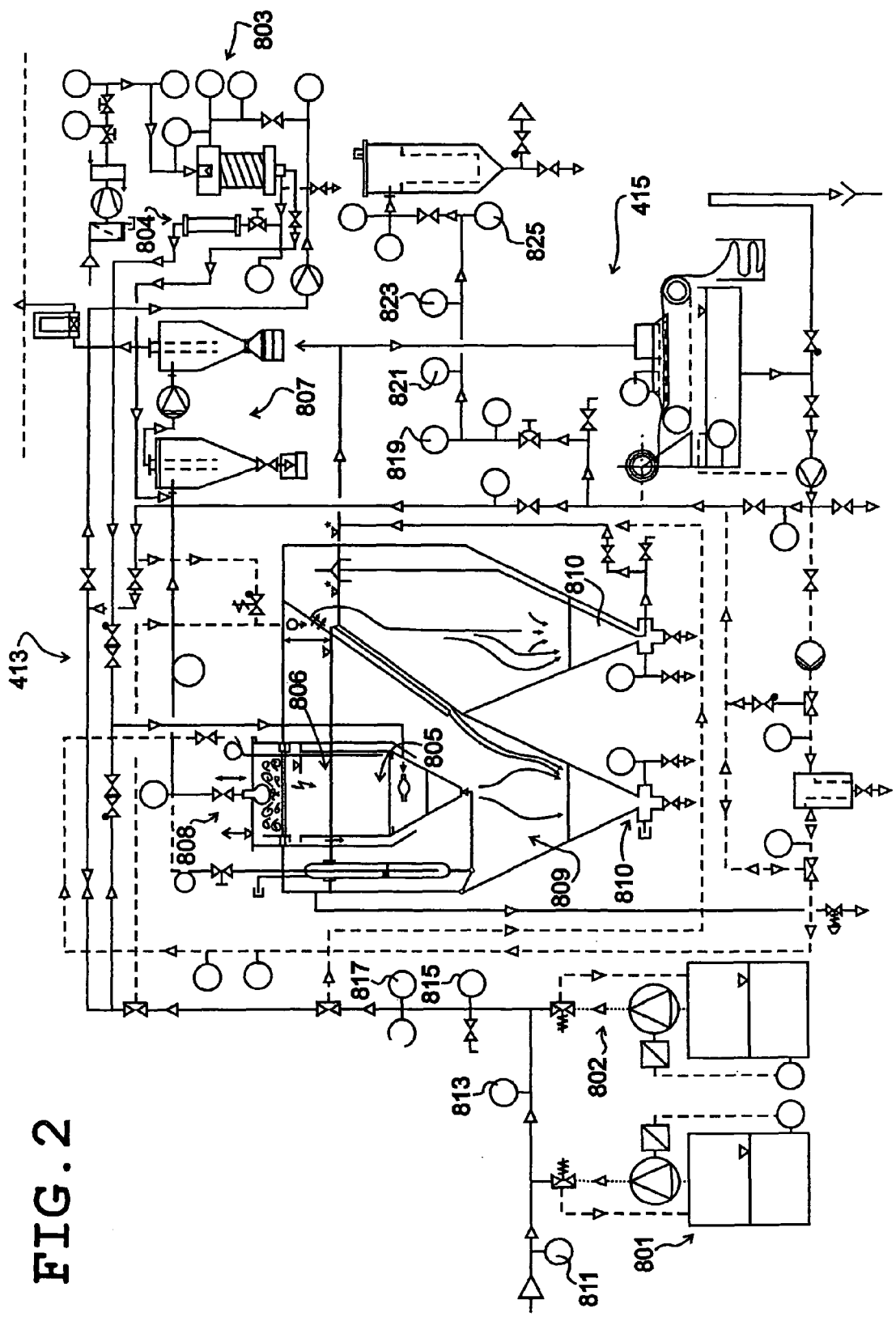
FIG. 2 is a diagram illustrating treatment sampling/testing locations for real time fluid testing and reporting which incorporates the apparatus and methods of this invention.

FIG. 2 shows nine of the ten apparatus of pre-treatment suite 413 (the ionized air/gas treatment is not identified). These include pH and chemical dosing apparatus 801 and 802, respectively, ODE/IDI membrane aeration apparatus 803, electrocoagulation apparatus 805, dissolved air/gas flotation 806, vacuum introduced cyclone separation apparatus 807, vacuum degassing 808, lamella plate clarification 809 and sludge concentration output 810. Additionally, eight testing nodes 811 through 825 are shown.

The primary function of the pre-treatment suite 413 is the removal or significant reduction (exceeding 90%) of colloidal matter with total suspended solids, such as polysaccharides or other slimy matter, less than about 75 nm. In addition, removal or significant reduction (by 80 to 90%) of fats, grease, oils and emulsions, and heavy metals (such as barium, strontium and others) by 60 to 99% is achievable. Finally, removal of entrained and produced gas by vacuum down to residual levels is achieved.

Figure 11:
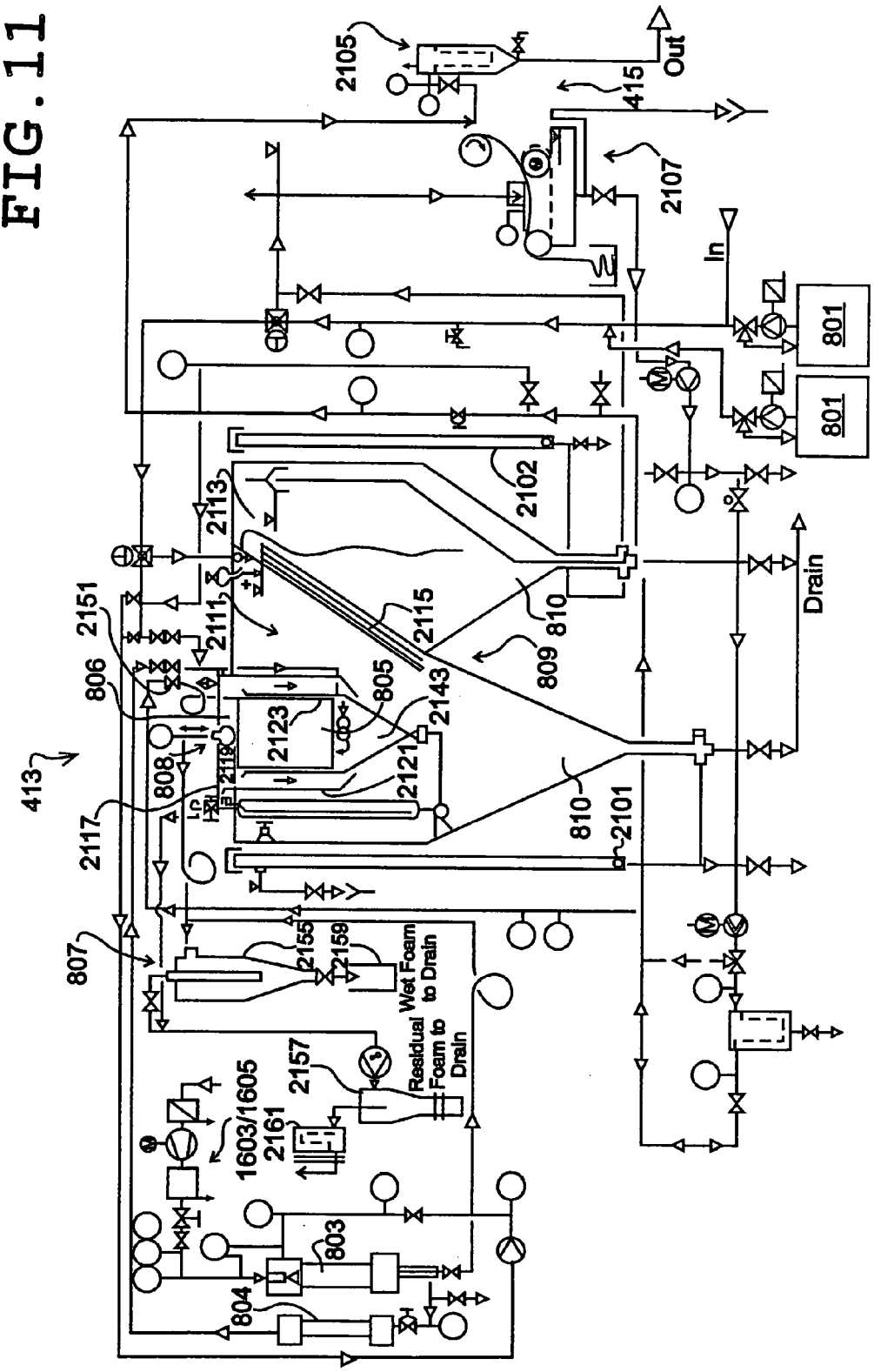
FIG. 11 is a diagram illustrating other components of the apparatus of this invention.
Figure 14:
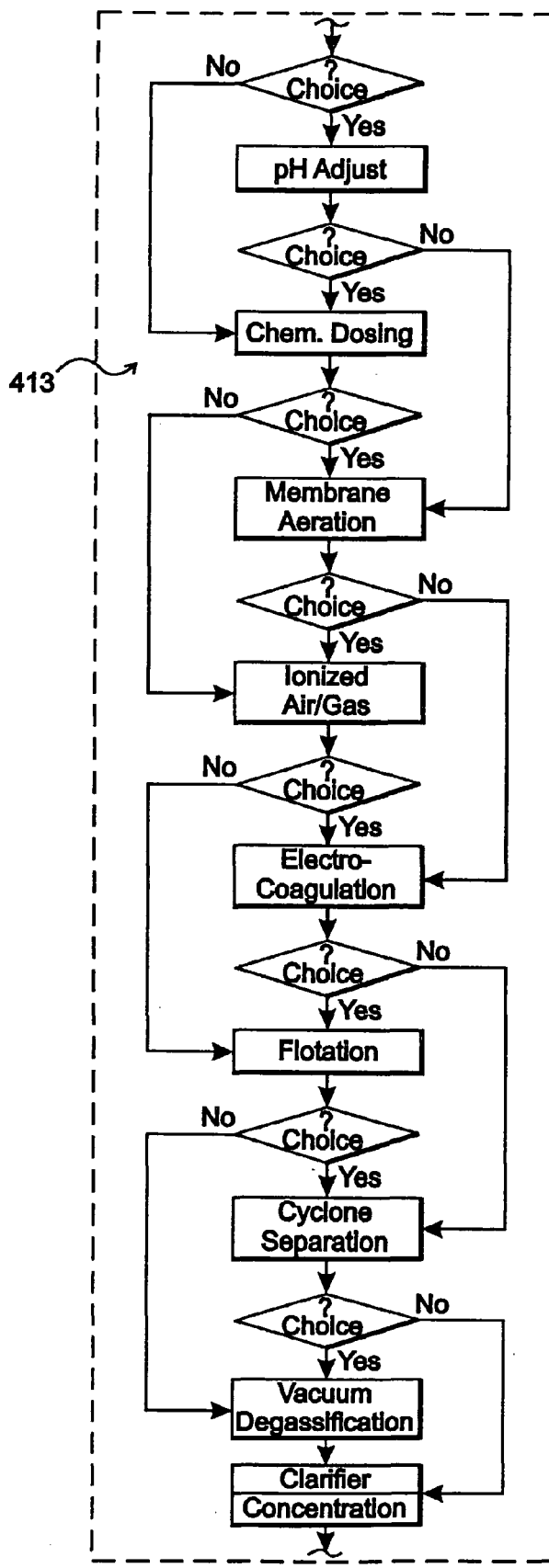
FIG. 14 is a flow chart illustrating treatment option selection and implementation in accord with this invention.

Detail regarding the various apparatus for performing steps 1 through 19 follows hereinbelow, with greatest attention paid the aspects of this invention as best shown in FIGS. 2, 11 and 14.

At stage 409, either of two types of inline heating systems may be utilized. Commercially, available inline electric water heaters set up for continuous operation may be utilized. These heaters, due to limited heat transfer capability, must be supplemented by a gas-fired tank heating system in an outside supply tank.

Figure 3:
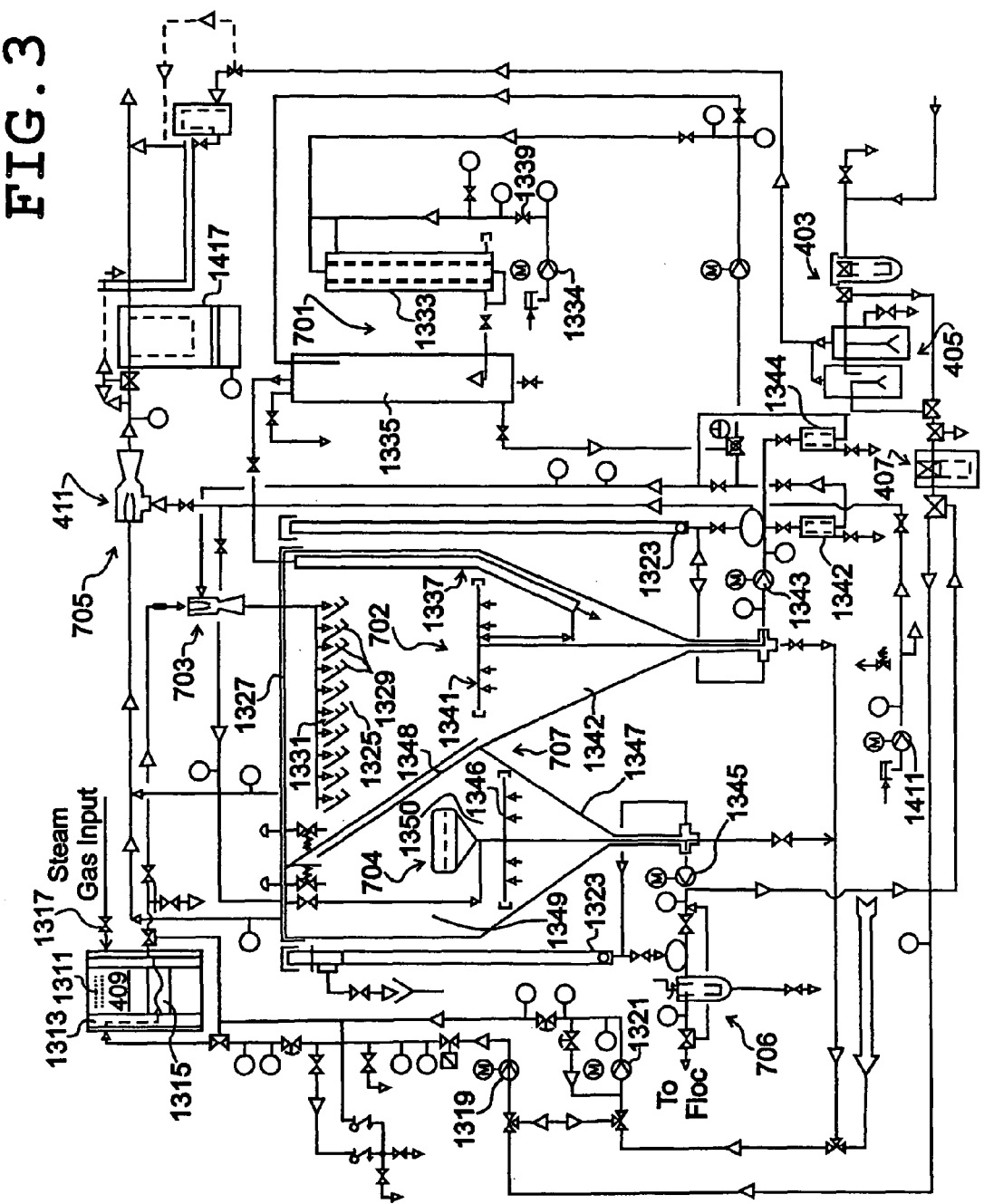
FIG. 3 is a diagram primarily illustrating portions of the apparatus of this invention.

Thus, the preferred method of water heating is an inline steam heating system for direct raw feed water heating which either does not require a gas-fired heater in the outside tank system or requires considerably less heating energy from the outside tank heater as shown in FIG. 3. This inline direct feed water steam heating system works in a steam diffusion mode where pressurized injected steam diffuses from an outer jacket 1311 through a tubular porous sintered ceramic, glass, stainless steel PVDF or PTFE membrane body 1313 into the feed water, which flows inside of the membrane. Also located inside of the membrane is a stainless steel static inline mixing element 1315 to provide a rapid homogenizing effect, whereby the mixing energy is derived from the mixers pressure drop.

The heating system is comprised of a gas-fired steam boiler system to produce a maximum steam flow of 25 KG/H, at a pressure of 150 psi., a pressure reducing valve with pressure indicators, a positioner control valve (from Burkert, for example), a steam flow control shut-off valve 1317, steam check valves (including one pressure indicator), a membrane steam contactor assembly (utilizing, for example, a Penberthy Steam Jet heater), and associated pipe spools. The membrane assembly is a stainless steel unit consisting of eight major components (intake flange with steam injection connection, end flange, two reducer bushings, outer pipe housing 1311, porous steam diffuser membrane 1313 (made of sintered metal, ceramic, glass or other materials), static inline mixer 1315, two high temperature seals, and four assembly stud bolts, lock washers and nuts.

The center piece is static inline mixer 1315 which sits inside of membrane 1313. The membrane itself is located inside the outer pipe housing. The smaller membrane diameter in conjunction with the larger pipe housing diameter provides the necessary ring room around the membrane, for the three dimensional diffusive steam transfer through the membrane into the feed water. These parts are end sealed by the seals, centered by the intake flange and end flange, and held together by the fasteners. The reducer bushings provide the connection between the smaller water lines and larger flanges of the membrane contactor assembly.

FIG. 3 also illustrates a second configuration of the pre-treatments suite stages 701 through 707 (sludge accumulation, concentration and return is not shown). Feed and return pumps 1319 and 1321 are the primary effluent pumps in the system. Several level sight glasses 1323 are deployed for operator oversight.

The primary function of stages 403, 405, 407 and pre-treatment suite 411 is the removal or significant reduction (exceeding 90%) of materials having total suspended solids (TSS) down to 100 μm, Fe and Mn precipitation of exceeding 80%, $CH_4$ gas stripping exceeding 90%, and mineralization of the organic contaminants exceeding 50%. The mechanical processes shown in the FIGURES include screen filtration, scraping edge and/or automatic backflush filtration. The physical treatment processes include membrane aeration, adsorption, desorption, precipitation, and sedimentation. The chemical treatment processes provided include absorption and oxidation.

Referring to FIG. 3, incoming raw feed water is blended in venturi water contactor 703 with oversaturated recirculation water. Venturi water contactor 703 provides homogenization of the raw feed water with the aerated recirculation water, and provides an environment for contacts between the suspended particles by fluid motion (orthokinetic flocculation). Agitation of suspension by increasing collision frequency promotes faster aggregation than does Brownian motion alone. Orthokinetic flocculation nearly always takes place in turbulent flow, in some form of shear conditions as can be provided by means, for example, of a cyclonic disperser.

The homogenized discharge from contactor 703 is fed through spray degassing sparger system 1325, the spray providing a preliminary degassing effect. Spray degasser sparger 1325 is mounted beneath a sealed lid 1327, and protrudes in the otherwise unused dead volume of lamella separator 707 above the clarification area. 55° inclined corrugated baffle plates 1329 of an inline cascade series waterfall 1331. The aerated gaseous spray is thus broken down into thin film layers and entrained fine droplets as it flows down surfaces creating a large thin contact area for gas and water.

The vacuum provided by the modified gas evacuator 705 is used for supplying the operating vacuum and pressure differential to induce gas release from solution, and to provide the motive force to evacuate the degassed loading of free $CH_4$ gas or other gasses from the degassing portion of the enclosed pre-treatment tank system at 707.

Because of droplet surface tension, a higher pressure is present in the aerated droplets which are entrained in the thin film layers on the plates (a lower bubble point). Therefore, to enhance degassing efficiency, optional to the corrugated plate degassing system, feed water heating at heater 409 is provided.

Figure 4:
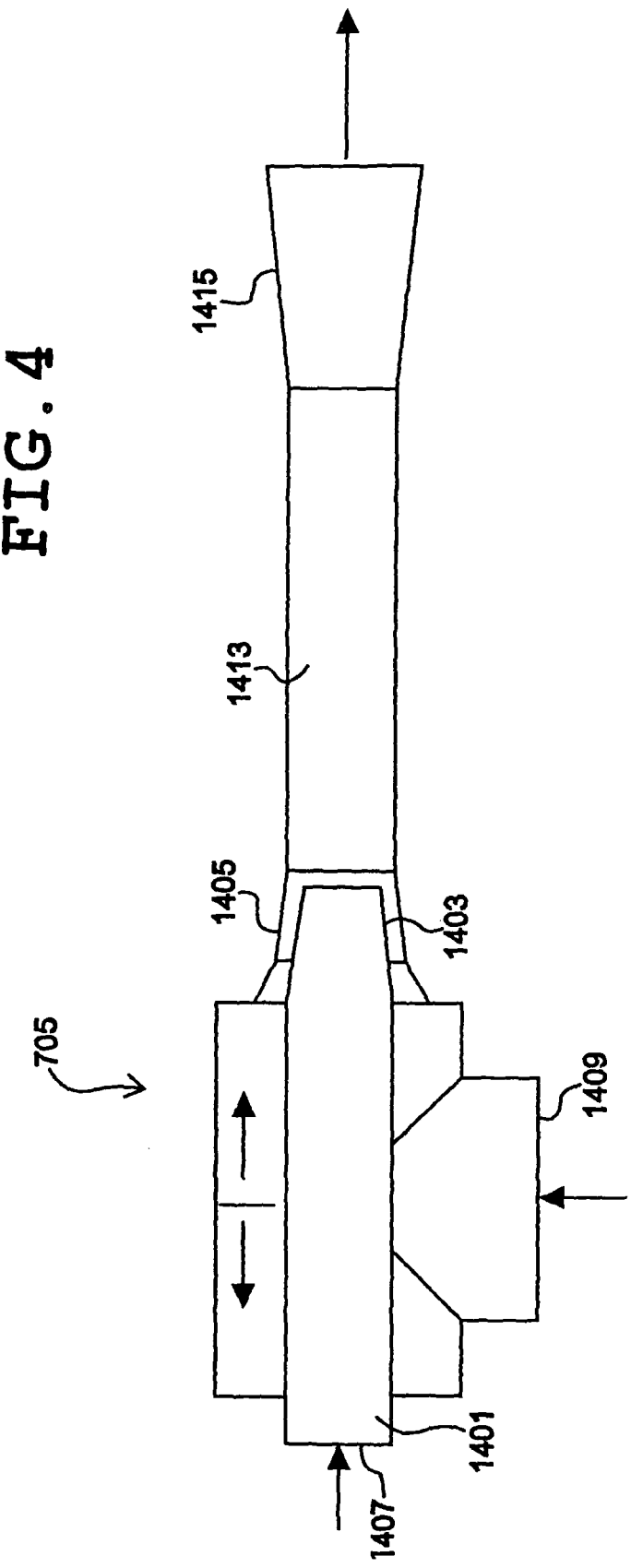
FIG. 4 is a sectional illustration of a gas liberator used in FIG. 3.

FIG. 4 illustrates a preferred embodiment of modified venturi gas liberator 705. The unit includes suction chamber 1401 with a 21° nozzle 1403 in cone 1405. Gas ($CH_4$) is drawn into chamber 1401 through inlet 1407 by pressurized air introduced at inlet 1409 from rotary vane blower 1411 (FIG. 3) through venturi cone 1405. Parallel section 1413 is connected at nozzle/cone 1403/1405 leading to 6° discharge diffuser 1415 discharging the $CH_4$ and air combination (to outlet stack 109 either directly or through adsorption filtration unit 1417—see FIG. 3).

ODE membrane aeration stage 701 shown in FIG. 3 provides oxidation for Fe and Mn contamination in the feed water, and preferably includes tubular or capillar membrane bundles. Feed water flows inside of tubular bundle or capillar membranes bundle 1333, whereat compressor 1334 supplies a continuous flow of volume and pressure controlled compressed atmospheric air at a pressure greater than water pressure. Feed water flows under minimal pressure inside of the tubular micro-filtration membrane 1333 and is continuously aerated from the outside of the membrane to the inside. Obstruction or clogging of the membrane pores from the feed water is thus avoided. Controls employed at stage 701 allow a minimum required power input to facilitate either the deironation or degasification process or both. The liquid and air flow volumes as well as their pressure readings are recorded by the onboard diagnostic systems and are scaled to determine full-size plant requirements. Since testings are done on-site, altitude and corresponding oxygen saturation levels are accounted for automatically.

The aerated feed water enters air bubble reactor 1335 and, after exiting at the top, is diffused at diffuser 1337 below the water surface lamella tank 707. If only deironation and/or manganese reduction needs to be done, no bubbles need to be present in reactor 1335. In such case, if air bubbles are shown in bubble reactor 1335, air flow is throttled back at valve 1339. An oxygen meter aids control of valve 1339 operation, and data output provides a permanent record for diagnostic purposes and full scale plant design.

A suction sparger 1341 is located on top the sludge chamber 1342. Thus, elevated suction for circulation pump 1343 minimizes recirculation of precipitated and sedimentated matter. Sparger 1341 has an elongated head to prevent suction channeling, while at the same time providing a positive suction head for recirculation pump 1343. Pump 1343 discharge feeds first through a selective inline filtration systems 1344. Two outlet streams result, the adjustable larger stream providing the motive fluid force for venturi water contactor 703 and the smaller stream being recirculated through membrane aeration stage 701.

The sedimentation process of precipitated iron and manganese as well as other suspended solid particles in sludge chamber 1342 goes through three phases: sedimentation of particles without interference with each other; transfer zone with interference; and compression, the particles forming a cohesive sludge layer.

Membrane aeration apparatus 701 and 803 at suites 411 and 413 respectively are advantageous in that a highly controllable, diffusive, mass transfer generating a large number of small and well-distributed bubbles with a large combined surface area, is more effective than a small number of large and not well-distributed bubbles with a small combined surface area, for instance generated by a less controllable venturi mass transfer technology. This diffusive mass transfer of air and/or ionized air or gas is a more economical technology compared to heretofore known approaches for mass transfer of ionized air/gas into a suspension.

Fluid density reduction at apparatus 702 creates an environment for increased turbulent micro bubble ascension, accelerating the degassing process, thereby requiring less degasser separation area for modified vacuum tower degassing at stage 703. In addition, the decreased density of the feed water provides reduced carrying capacity for heavier suspended solids thus expediting descent and sedimentation.

Standard air stone degasser technology is employed at apparatus 704 to efficiently aerate fluid at lamella separator 707 in clarifier section 1349. This is done to facilitate the release or reduction of entrained carry-over gas through the integrated lamella separator 707 in the event of critically high $CH_4$ gas loading. Likewise, fine filtration at apparatus 706 in the range of 100 μm is provided by commercially available self-cleaning automatically operating filtration units such as the standard edge filter unit from WFT or TEKILEEN's Minitwist series low-flow fully automatic self-cleaning filtration system. Fine filtration apparatus 706 is configured to filter the clarifier 707 fluid/effluent. The clarified fluid is pumped from the clarifier buffer tank compartment 1350 by means of filter pump 1345. Filter pump 1345 is gravity-fed through suction sparger 1346, located in the elevated section of the clarifier's small sludge chamber 1347 to avoid the suction intake of entrained air produced by air stone apparatus 704 and precipitated, as well as sedimentated, matter from small sludge chamber 1347.

Regarding lamella unit 707, a two in one tank design is employed wherein a large clarifier, development and degassing tank section with attached large sludge chamber is separated from a small clarifier catch and buffer tank with attached small sludge chamber by integrated lamella separator 1348. Self-sealing lid 1327 is activated by the controlled operating vacuum. The design of the integrated lamella separator 1348 into clarifier tank system 707 provides additional clarification area without increasing the working volume of the clarifier, thus providing a reduced footprint. Sludge return is fed into low shear return pump 1321 and could be (with appropriate valve control) re-circulated through the venturi water contactor 703 before collection.

Figure 5:
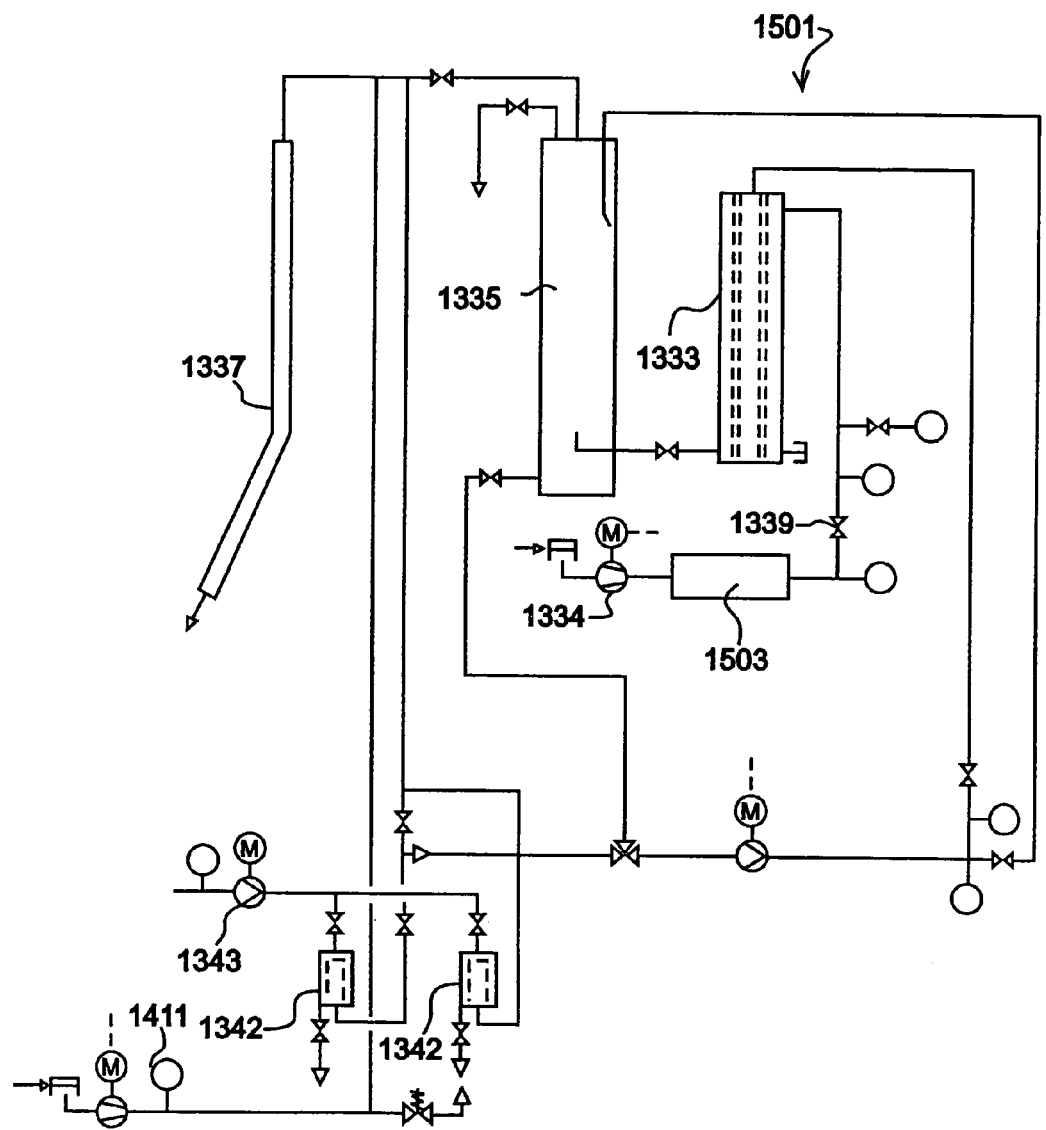
FIG. 5 is a diagram illustrating a second embodiment of one of the components utilized in this invention.

Turning to FIG. 5, another embodiment 1501 of ODE membrane aeration stage 701 is shown. As in the embodiment shown in FIG. 3, this embodiment includes tubular bundle or capillar membranes bundle 1333, with compressor 1334 supplying a continuous flow of volume and pressure controlled compressed atmospheric air. Aerated feed water enters air bubble reactor 1335 and, after exiting at the top, is diffused at diffuser 1337. Air flow is controlled a variable valve 1339. However, between compressor 1334 and bundle 1333, the air is ionized at ionized gas generator 1503 for decontamination of membrane bundle 1333.

With reference to FIGS. 6 through 13, various embodiments of components of second pre-treatment suite 413 are discussed (see also FIG. 2). Regarding both ionized air/gas generation monitoring apparatus 804 and membrane aeration apparatus 803, in accordance with another aspect of this invention, improved ion treatment and reactor technologies, applications and methods of use are described. This aspect of the invention relates to effluent treatment utilizing ionized air or gas and membrane aeration, and has its objects, among others, enhanced ionized gas transfer through known membrane aeration technology providing energy efficiency over conventional venturi technology. Using this technology, ionized gas transfer into feed water is further enhanced by means of a static-in-line mixing comprising, for example, a progressive single coil system or an electrically charged dual coil system made from conductive but non-sacrificial material such as synthetic graphite.

Use of this system with apparatus 805 provides oil-free ionized air to the electrocoagulation feed stream and reduces feed water density and solids carrying capacity of the electrocoagulation apparatus feed stream. This in turn allows for quicker, more complete solids fall out in the electrocoagulation process and expedites the ascension of lighter that water solids (especially when vacuum assisted).

As will be seen, an integrated coil mixing system is conveniently located between a portion of the outer membrane side and the inner reactor wall of the liquid side. A gas ionization chamber is an integrated part of the membrane support body. A radioactive energy source for gas ionization may be utilized, and is directly connected to the ionization chamber thus minimizing occurrences of recombination of ion pairs prior to their diffusive transfer into the liquid phase. Transparency of the reactor's housing and coil support body allows for visual inspection of the microbubble column and is controllable through means of associated valving conveniently located on a reactor mounting panel. The reactor's ionized air input is monitored and controlled by means of an in-line oxygen sensor and controller unit. The feed quality is monitored and controlled by means of conductivity meters at the incoming feed and the outgoing treated water lines.

In order to affect a reasonable fallout rate of contaminants in the water after electro-coagulation, it is necessary to add a chemical polymer prior to the electro-coagulation cell. If no chemical is added, fallout rates are unacceptably long. For a full size plant, this adds a burdensome financial component with respect to chemical costs and plant footprint. Slow fallout rates translate into large tanks for increased retention times.

Ionized air is a well recognized and employed technology in the field of air purification. By creating a large number of negatively charged oxygen ions and positively charged nitrogen ion, the ions then released into the air where they attach themselves to floating particulate matter of opposing charge, heavier particles are created through charge neutralization thus allowing them to fall to the ground effectively reducing airborne contaminants. The following teaches similar approaches at apparatus 803 and 804 of pre-treatment suite 413 for agglomerating, or coagulating, waterborne contaminants which are otherwise too small or incorrectly charged for easy removal.

Most waterborne contaminants in particulate form are charged. The charge can be positive or negative, although most particles in certain post industrial effluents (such as coal bed methane water) develop a negative charge. When the particulate matter freely floats in water, they are continuously being repelled by each other, this repelling action making the particles difficult to agglomerate to form a more easily removable mass.

By introducing a stream of negatively and positively charged ions into the water, one can effectively neutralize the particles specific charges thus allowing them to be brought into intimate contact to form more easily precipitated matter. Once the interparticle repulsive forces have been neutralized, the fallout rate in and after processing by electro-coagulation apparatus 805 will be enhanced and chemical treatment needs will be eliminated or drastically reduced. This process might also speed up and enhance the iron and manganese precipitation process as well. Finally, these ions are also very disinfective to harmful biologic components present in some feed waters presented for treatment and its holding tanks.

Figure 6:
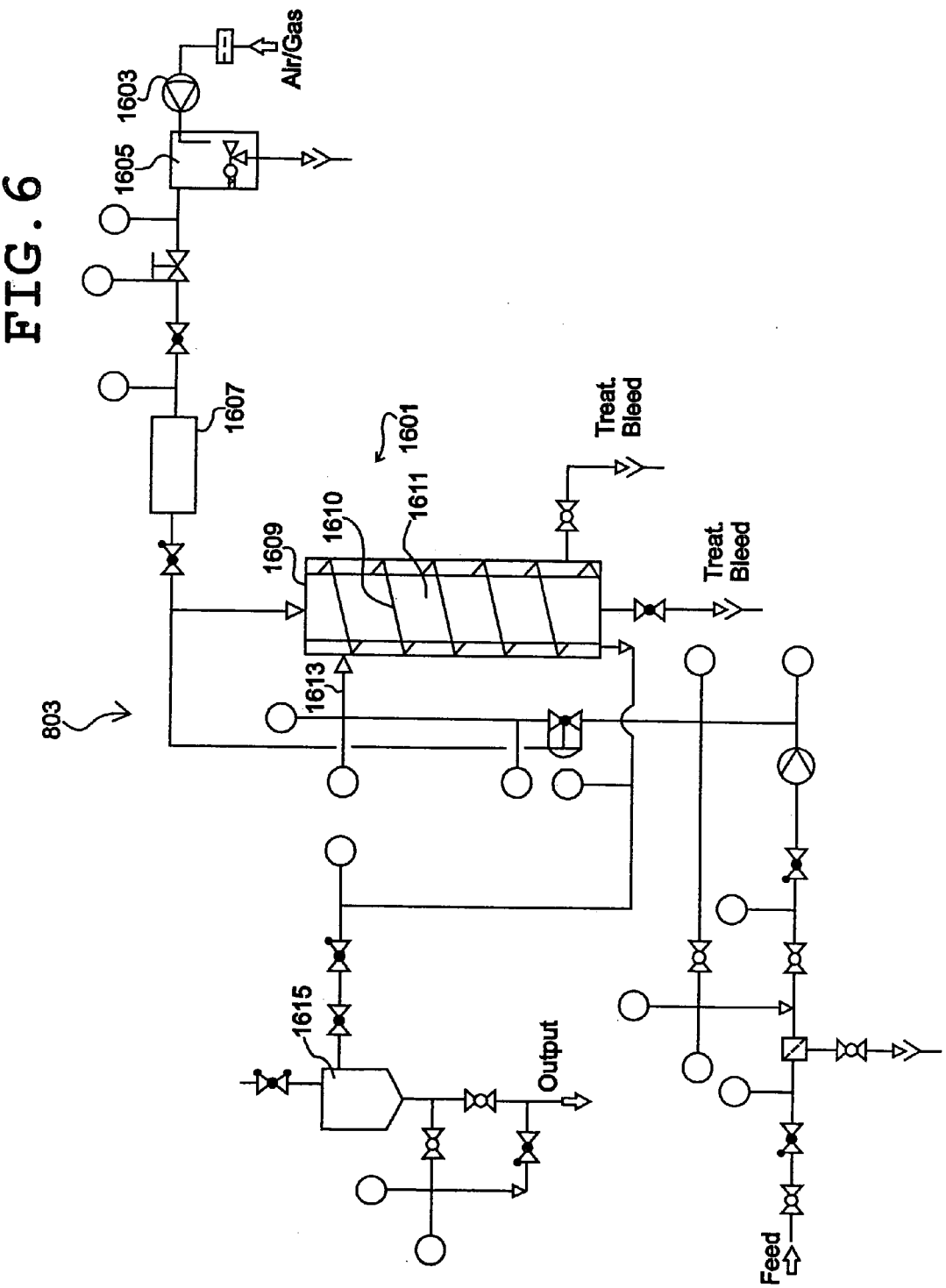
FIG. 6 is a diagram illustrating a first embodiment of a membrane aeration apparatus used in this invention.

FIG. 6 shows a first embodiment 1601 of membrane aeration apparatus 803 of second pre-treatment suite 413. Air is received at compressor 1603 and separation vessel 1605. Output from vessel 1605 is exposed at VUV/UV unit 1607 (an annular incoherent exciter UV source with inward directed, coaxial, radiation geometry for UV radiation in the 130-160 nm range), the air and/or plasma-gas being fed through a perforated membrane support body 1609 equipped with coiled feed grooves having spring 1610 thereat. Support body 1609 carries membrane sleeve 1611 with the active membrane side facing outwardly. Membrane sleeve 1611 is sealed on both ends of cylindrical support body 1609. Hydrophobe, anti-adhesive, semi-permeable membranes are employed for this ODE/IDI process (any flat commercially available flat sheet membrane can be used). The entering air and/or plasma-gas through the passive membrane side of membrane sleeve 1611 has a slightly higher pressure than the outside liquid pressure on the active membrane side, thereby avoiding the initiation of a filtration process.

Liquid is fed at input 1613 around support body 1609 and over and around the active membrane side of sleeve 1611 along grooves 1610 in a coiled manner. This provides a well distributed, non-plugging turbulent flow regime over the net active membrane area which also enhances blending and particle collisions. Spring 1610 of the coiled feed path is a preferably a PTFE coated 300 series stainless steel spring or a PVC spring. Spring 1610 securely rests in a matching groove inside of a clear PVC outer housing body (not shown). Unit treated water output passes through separation vessel 1615 before output to subsequent treatment apparatus.

The higher air and/or plasma-gas pressure provides adequate sealing action between the active membrane side and the coiled feed path. The thickness of the coiled feed path in relation to membrane sleeve 1611 diameter is in the range of 1:5 to 1:500. Coil feed path length in relation to sleeve 1611 length is in the range of 2:1 to 200:1. As maybe appreciated membrane cost savings are realized while ease of membrane exchange or replacement and large membrane area are provided. Visual inspection of bubble generation is allowed through the clear outer housing body enabling better bubble control. Embodiment 1601 maximizes efficiency due to integrated non-plugging inline mixing (no added static inline mixing device is needed) and compact design.

Figure 7:
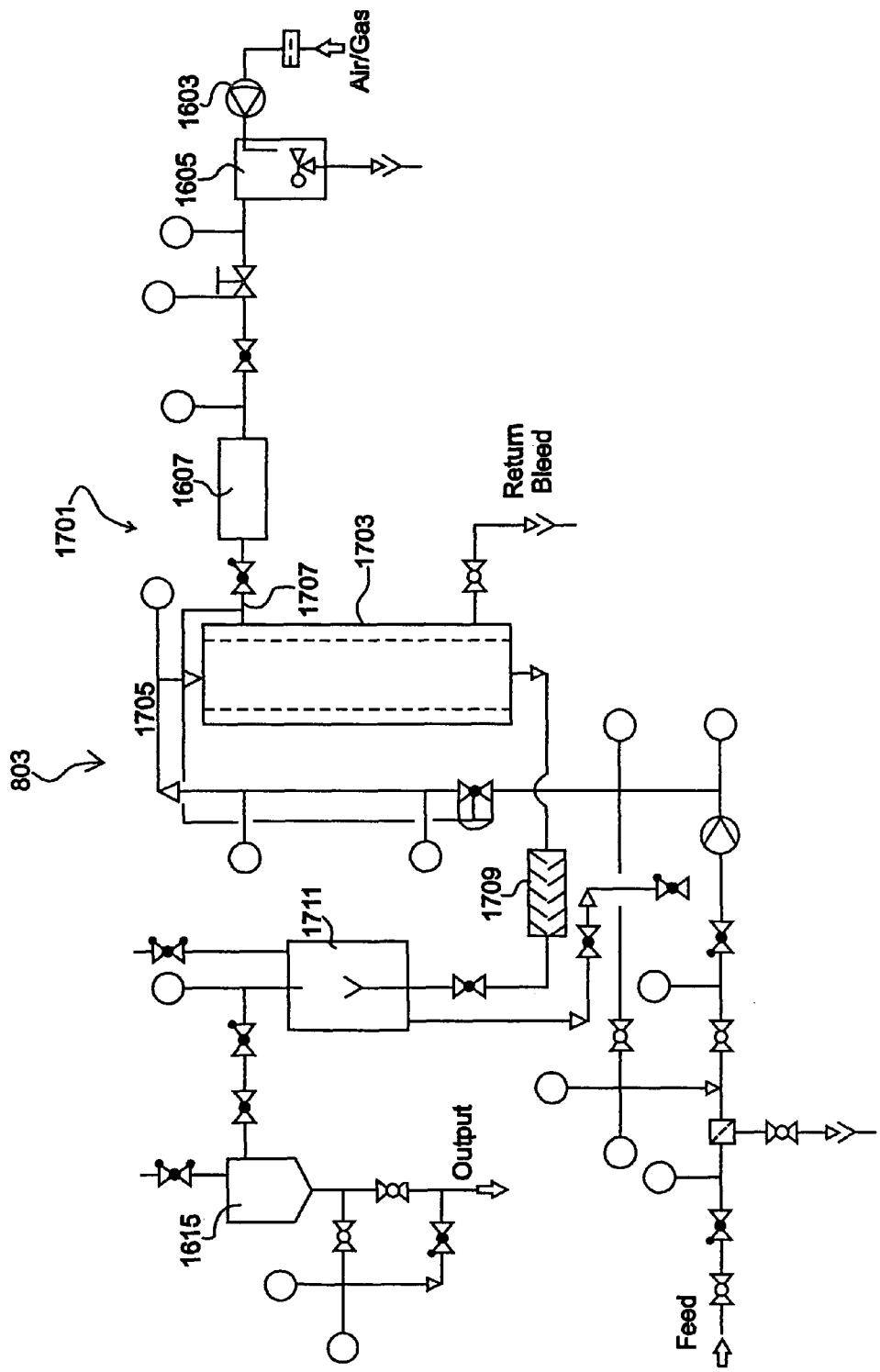
FIG. 7 is a diagram illustrating a second embodiment of a membrane aeration apparatus.

FIG. 7 shows a second embodiment 1701 of membrane aeration apparatus 803 of second pre-treatment suite 413 (similar elements retaining numbering from prior occurrence). In this second ODE variation, tubular or capillar membrane bundles are employed at aerator unit 1703. Pretreated feed water flows through input 1705 inside the tubular or capillar membranes, again at a lower pressure than from the outside applied air and/or plasma-gas received at the unit at input 1707. Flow from unit 1703 is received at in-line static mixer 1709 and bubble development control column 1711 prior to output.

The air and/or plasma-gas diffuses with only a slightly higher pressure above the liquid pressure through the semi-permeable tubular or capillar membrane without initiation of the filtration process. Feed water is continuously aerated and/or gassed with plasma-gas through the tubular or capillar semi-permeable membrane from the passive outside to the active inside thus reducing obstruction or clogging of the membrane pores. The membrane inside diameter is in the range of 1 to 10 mm. The membrane wall thickness range is between 0.1 and 1 mm. Preferred membrane materials (for this, the previous and the following aeration apparatus embodiments) are PVDF, PP, PE, HPE, PTFE and PFA.

Figure 8:
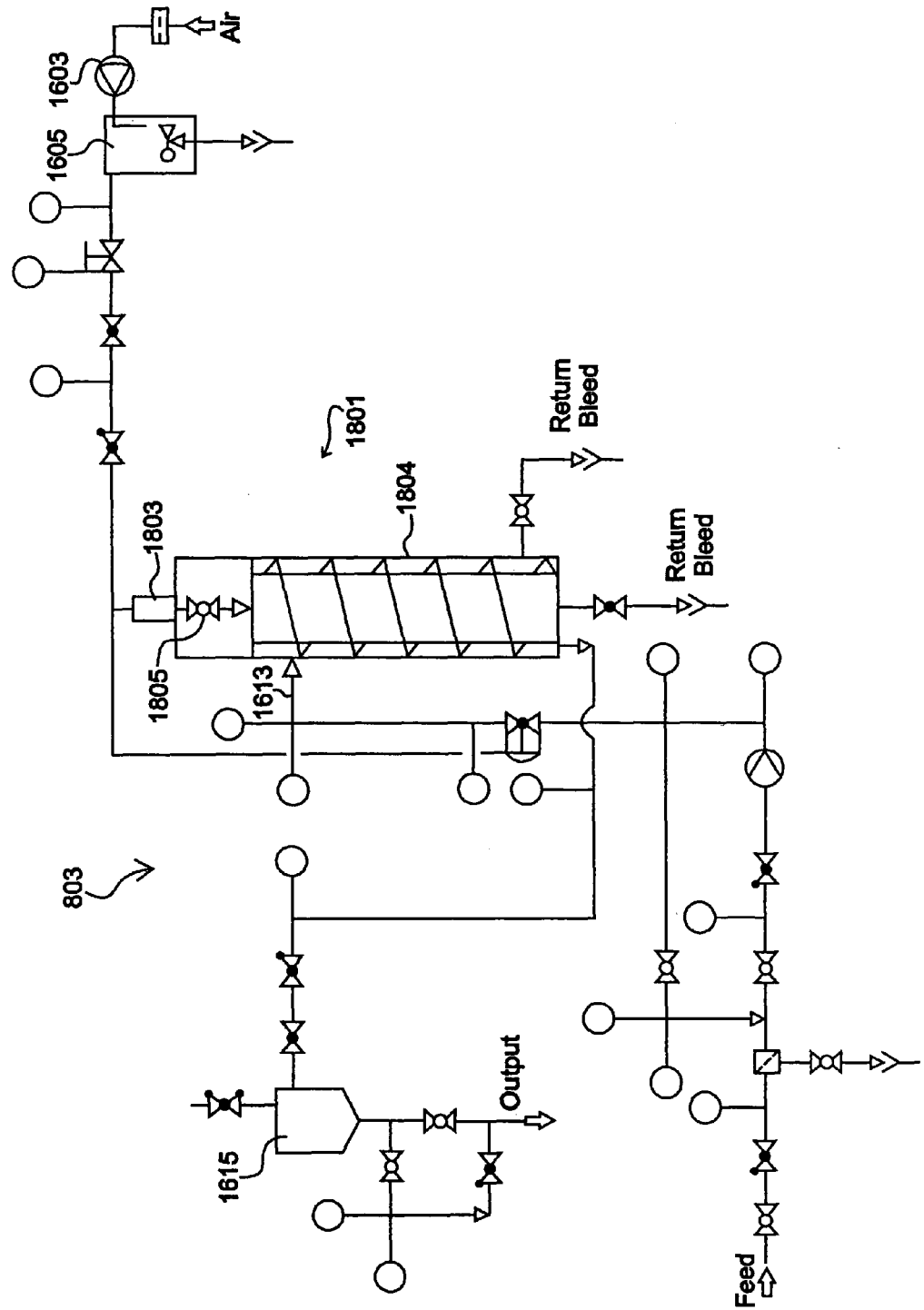
FIG. 8 is a diagram illustrating a third embodiment of a membrane aeration apparatus.

FIG. 8 shows a third embodiment 1801 of membrane aeration apparatus 803 based on inline diffusive ionization (IDI). Similar elements retain their numbering from prior occurrences. UV-based treatment processes for air and water have long been commercially available. Where economically acceptable this kind of equipment can be readily configured for use with ODE technology (as shown in FIGS. 6 and 7).

Most manufactures of UV-based technology do not offer industrial hardened units in the proper wavelength range for post-industrial applications such as oilfield use. Pulsed UV is still a rarity in the far UV range of 130 to 160 nm. The available UV equipment is expensive, has low UV bulb life, and has high energy consumption requirements.

The IDI implementation of this invention integrates a proven and readily available polonium origin particle emitter 1803 (for example, from NDR, Inc.) with a modified ODE contact reactor 1804 having a compact and industrial hardened design. Particle emitter 1803 is used to create a highly ionized stream of air/gas through ball valve 1805 into reactor 1804 for infusing a liquid through the reactor membrane, the number of free electrons approximately equal to the number of positive ions (known as plasma gas).

Emitter 1803 uses the naturally occurring radio isotope Polonium 210 as the internal energy source for emitting unstable nuclei of Po210 atoms in the form of $\alpha$-particles (in essence an inert helium atom (4/2 He) stripped of its electrons). The ejection energy is high enough to cause the ionization of $O_2$ molecules of the air (5.3 million electron volts). $\alpha$-particles carry a positive charge of low density, and, in collision with atoms in air, knock electrons out of oxygen and nitrogen atoms. This ability to scatter electrons and send them to other molecules leaves positive nitrogen and oxygen molecules and forms negative ions. In this way, the collisions produce positive and negative ion pairs that result in an inherently balanced ion output from the nuclear ionizer emitter 1803. Each $\alpha$-particle produces about 134,000 ion pairs, and there are $2.2 \times 1012$ $\alpha$-particles emitted per minute per curie.

These positive and negative pairs like all air ions, no matter how they are produced, will recombine. Since the ions must reach the feed water to neutralize the feed water contaminants before they neutralize each other, a compressed air/gas stream is used to diffusively aerate the ionized air or gas through the hydrophobic membrane of reactor 1804 to reach contaminants in the feed water. Because a radioactive source is used, no electrical usage is required. Since the radioactive emission cannot be influenced by either physical or chemical means, it is not necessary to employ highly transparent and reflective reactor materials such as those employed in air ionization with UV technology.

Emitter 1803 can be built directly into contact reactor 1804, which is not possible with UV or Corona discharge means. This shortens the time necessary for transmission in the system. OH-radicals last only 10 milliseconds in water, and only 1 second in air. Since these lifetimes in air are so brief, it becomes imperative to produce the radical and subject it to the water stream in as short a time frame as possible. Contact mixing efficiency is further enhanced by means of a progressive flow path which is coiled around the reactor membrane (as discussed hereinabove). Generally, the fluence (ionized air dosage) decreases as the feed water flow rate increases because the residence time in the contact reactor is inversely proportional to the feed water flow rate. However, the dependence is non-linear because at higher flow rates the radial mixing efficiency of the static inline progressive coil mixing element increases. The gas primarily will consist of $H_2O$ as water vapor in the air, $O_2$ and $N_2$ from the air. To control the amount of $H_2O$ in the feed gas, as with the other embodiments, the gas passes through separator 1605.

Figure 9:
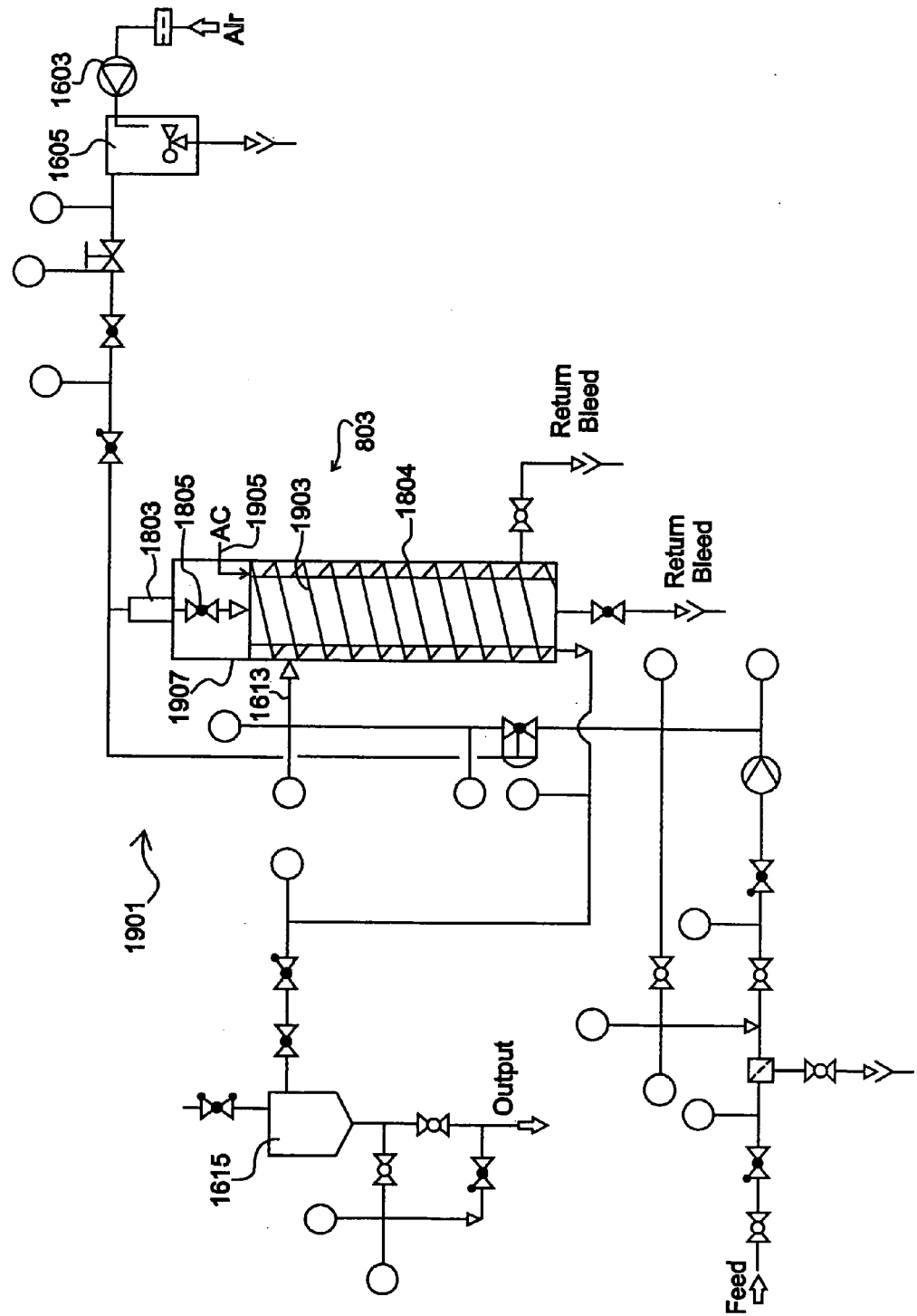
FIG. 9 is a diagram illustrating a fourth embodiment of a membrane aeration apparatus.

FIG. 9 shows a fourth embodiment 1901 of membrane aeration apparatus 803 of second pre-treatment suite 413 (similar elements retaining numbering from prior occurrence). Here, the radial mixing is enhanced through means of an electrically charged Dualplex-start-Coil-System (DSC) mixing system. The DSC consists of two independent, non-touching coils 1903 with an even pitch spacing twisted around the membrane. The coils are situated in the space between the outside diameter of the membrane and the inside diameter of the grooved support body. These coils are made of non-sacrificial, but conductive material, for instance graphite or graphite coated support material.

The proper non-touching spacing between the two coils is provided and secured through a thinwalled duplex-start grooved support body, made of clear nonconductive PVC. The duplex-starts in the support body are offset to each other (i.e., turned by 180°). Pitch of each coil and groove of one inch, providing a pitch distance of half an inch between the two independent coils, suggest good performance for most applications. The coils are screwed into the support body concurrently and the support body is inserted as a cartridge into a reactor glass body tube. The outer support body diameter is sealed against the body tube (using O-rings, for example).

AC power is received at connector 1905 connected to coils 1903 at a vessel cap 1907. The vessel cap in configured to provide for electrical connection away from the liquid phase. In essence this embodiment operates similar to an electrocoagulation system with non-sacrificial electrodes, the electrically charged mixing coils 1903 representing the electrodes and the pitch spacing representing the electrode C—C distance. The operating current of the system is preferably 4 amps with a frequency converter setting of between 1 and 10 hertz.

While shown utilizing the emitter 1803 of the third embodiment, this embodiment can be employed also with photo (UV) initiated air ionization technology. If radioactive initiated air ionization is employed, the positively charged α-particles will deflect towards the negatively charged electrical field. The frequency controlled alternating deflection of the α-particles takes place primarily within the upper portion of the ionization chamber. This alternating deflection provides additional collision potentials with the continual incoming large number of neutral air molecules, thus slowing the recombination of positive and negative ion pairs prior to exposure to the contaminated effluent.

The alternating current flow provides an enhanced distribution environment for the diffusively aerated ionized air/gas for balancing the surface charge of particles in the feed water solution thus removing or reducing the electrical repulsive charge on the particles. This hydrodynamic mixing energy, provided through the differential pressure of the flow altering coil system, generates a turbulent fluid motion environment for interparticle contacts, sometimes called orthokinetik flocculation. The interparticle contacts of charge neutralized materials (for example, colloids) now destabilizes out of the dispersion, followed by collision of destabilized particles to form aggregates. The aggregation of these particles into larger more easily settled aggregates is necessary for efficiency enhancement of following processes where separation by precipitation, sedimentation and flotation takes place.

Figure 10:
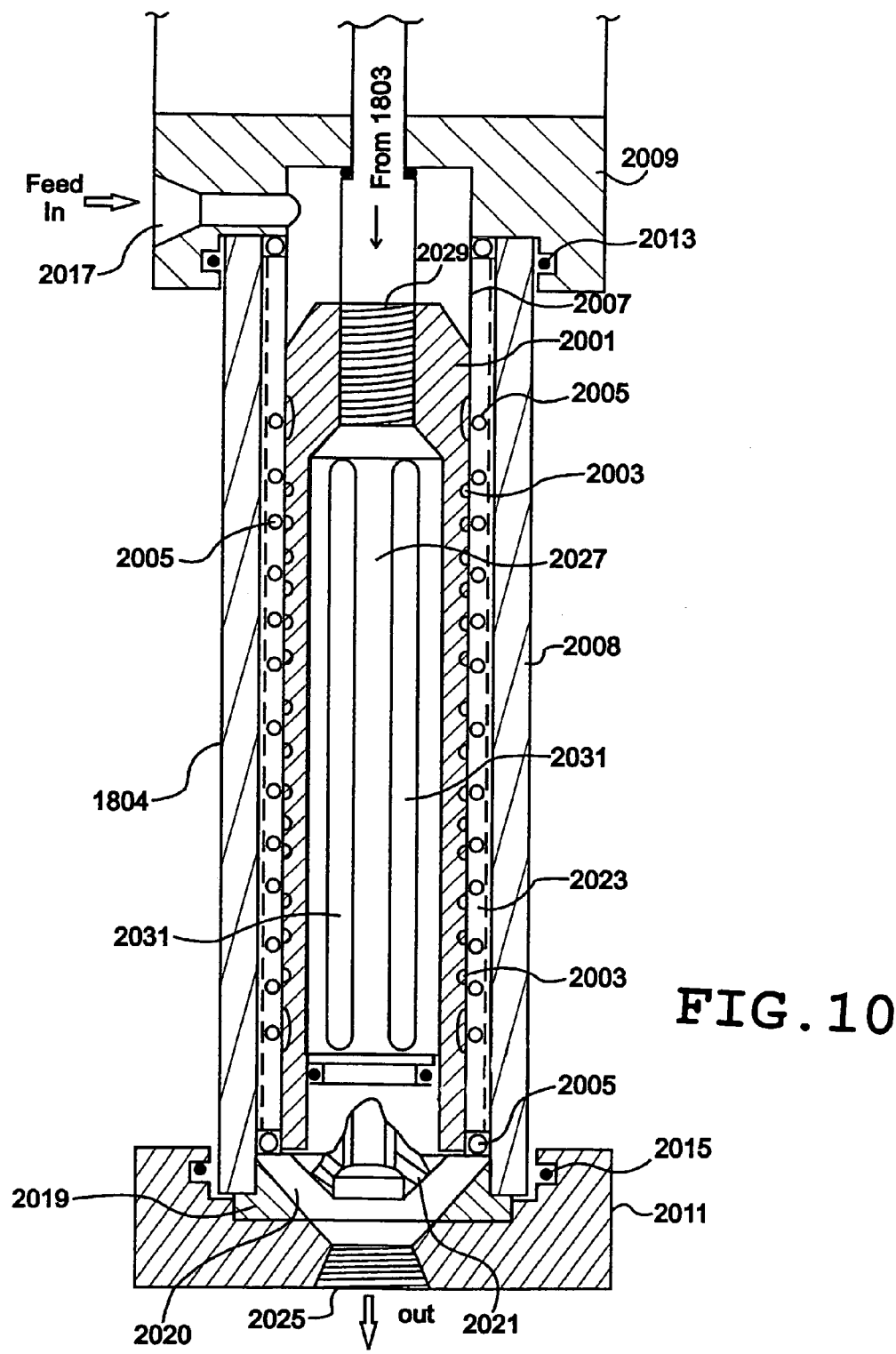
FIG. 10 is a sectional illustration of a membrane aeration apparatus of this invention.

Reactor unit 1804 is shown in FIG. 10 (though many of the features thereof are similar to others of the reactors units shown in FIGS. 6, 8 and 9). The unit includes perforated membrane support body 2001 equipped with coiled gas feed grooves 2003 having positive pitch. Gain twist mixing coil 2005 facilitates fluid flow and secures hydrophobic membrane sleeve 2007 on support body 2001, the active membrane side facing outwardly. Membrane sleeve 2007 is sealed on both ends of cylindrical support body 2001.

This assembly is received in clear reactor sight glass/outer body 2008, upper and Lower caps 2009 and 2011 applied and sealed thereat by O-rings 2013 and 2015, respectively. Feed inlet port 2017 is defined in cap 2009 and retainer and transfer plug 2019 is received between cap 2011 and outer body 2008 for, in combination with a series of included fluid transfer holes 2020 adjacent to conical end 2021 of support body 2001, channeling flow at flow channel 2023 to outlet port 2025 defined in cap 2011. The compressed stream of ionized air/gas received from emitter 1803 is received into support body expansion chamber 2027 through port 2029. Slots 2031 are formed around support body 2001 for less obstructed ionized air transfer through membrane sleeve 2007 into the aqueous flow.

In unit 1804, the ionization of the induced air and the diffusive transfer of the ionized air through the reactor membrane into the feed water starts in the upper portion of the reactor chamber, into the starting point of turbulence. The turbulence is generated by means of the progressive flow path coiled around the reactor membrane. The gain twist coil path provides a high energy efficient collision environment for the ionically destabilized particles in the feed water to form aggregates. The key to the high energy efficiency of the progressive gain twist static inline mixing coil lies in the fact that it substantially operates as a plug flow device. All material passing through it receives the same blending experience. The same amount of energy or foot pounds of work per gallon has been expended on all the incoming feed water. None is over-blended and none is under-blended.

All embodiments shown in FIGS. 6 and 8 through 10 are much more effective than conventional venturi technology for the ionized air-liquid-solids systems. The diffusive ODE/IDI technology provides a defined three-dimensional diffusive phase contact transfer environment with the medium. Since conventional venturi type blending does not provide such a defined phase contact area, the phase contact within the molecular and micron range takes place by undefined chance rather than design and, therefore, lacks effectiveness by comparison.

Furthermore, the conventional venturi contactor works with a relative low pressure differential and, therefore, a low vacuum suction for air and/or ionized gas. In contrast, the higher and variable pressure operating membrane technology herein diffuses more air for bubble generation and/or ionized gas effectively into the feed medium. While recirculation can be provided, ODE/IDI systems of this invention are effective in a once through on the fly treatment. With the integration of the ODE/IDI units of this invention a reduction of operating costs through energy savings and capital cost for reactor construction are realized, and a smaller treatment facility foot print is enabled.

Figure 12:
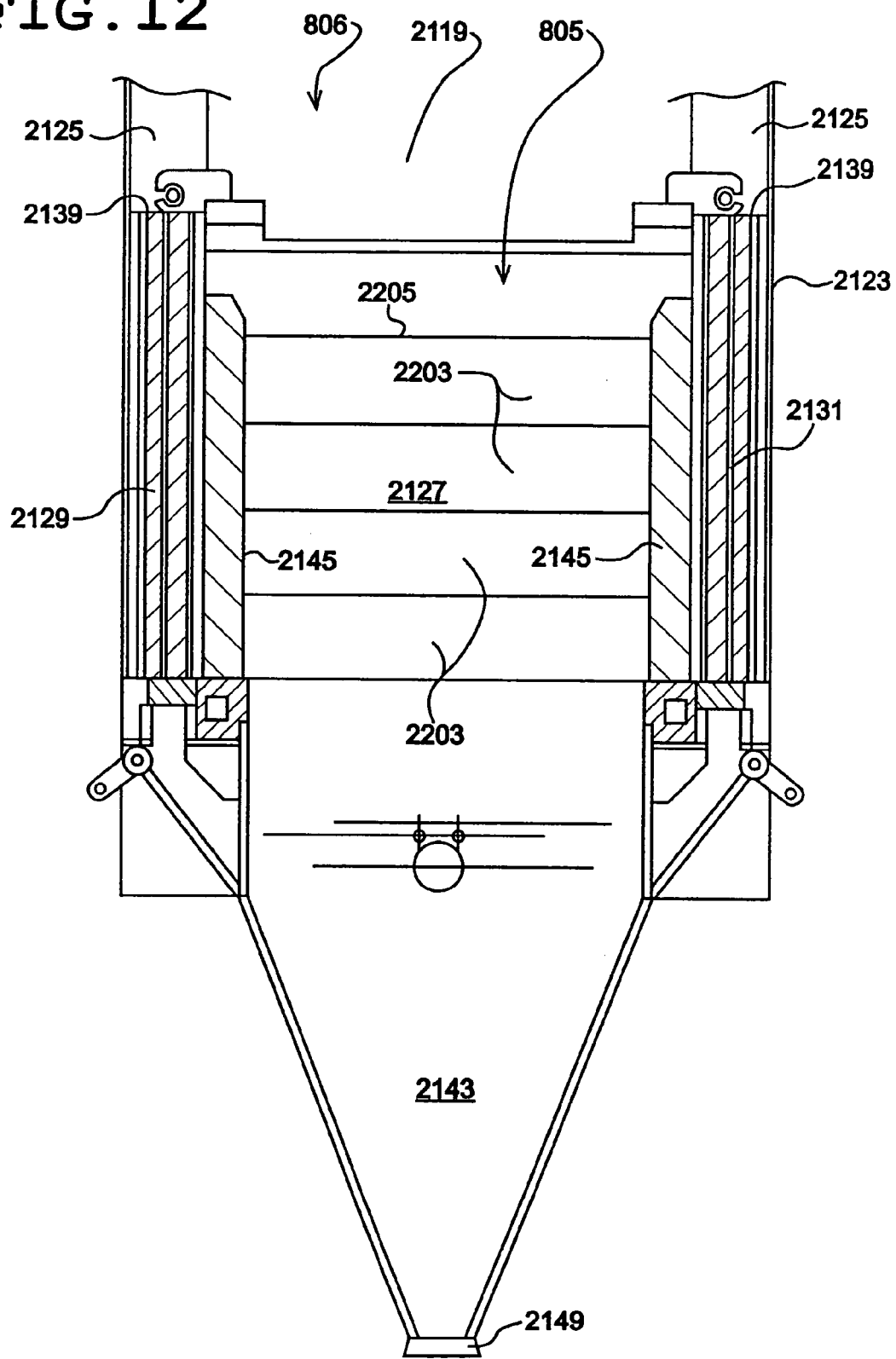
FIG. 12 is a sectional illustration of an electrocoagulation unit utilizable in this invention.
Figure 13:
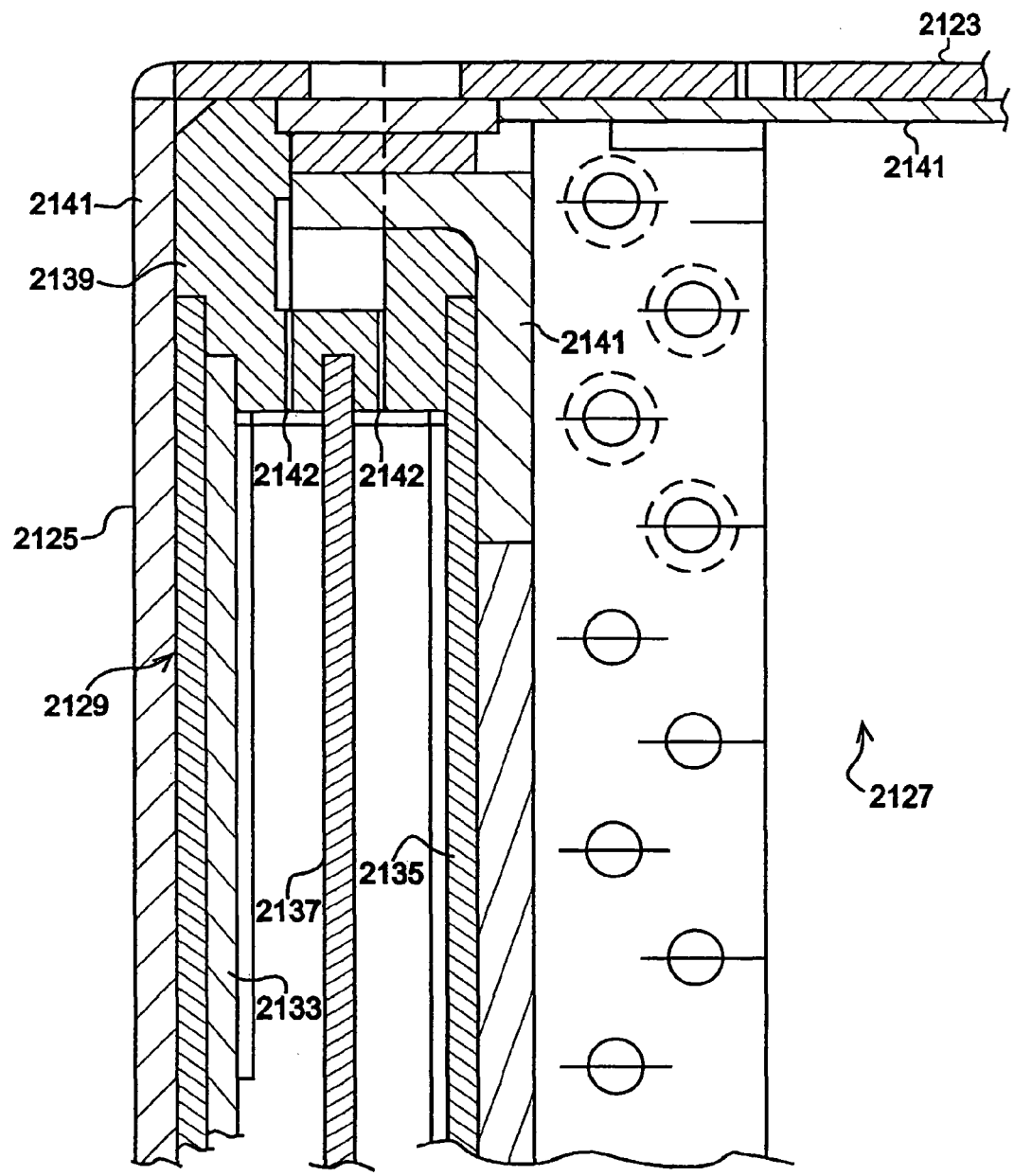
FIG. 13 is a partial sectional illustration of the housing of the unit of FIG. 12.

FIGS. 11 through 13 show various other apparatus of second pre-treatment suite 413, FIG. 11 illustrating a particular arrangement of suite 413 including the ten apparatus 801 through 810 heretofore identified configured with selected piping, flow control and instrumentation configuration. IDI inline ionizer unit may be any known alpha ionizer such as the STATICMASTER series form NRD and related instrumentation. Level sight glasses 2101 and 2102 allow convenient on-site process inspection. Output from suite 413 proceeds to stage 415 (step 7) including bag filter system 2105 and belt filter system 2107.

In accordance with another aspect of this invention, FIGS. 11 through 13 and the following description illustrate the electrocoagulation apparatus and configuration in accord with this invention. Electrocoagulation apparatus 805 operates conventionally but includes a number of unconventional features. In addition, apparatus 805 is positioned in tank 2111 (the larger of the two tanks 2111 and 2113 separated by separator plate 2115) of lamella plate clarifier apparatus 809. Electrocoagulation operates by the splitting off of ions from sacrificial or non-sacrificial electrodes in apparatus 805 into the water presented for treatment to destabilize suspended, emulsified or dissolved contaminants in the water by introduction of an electrical current. The water acts as an electric conductor in which current is carried, thus forming a hydroxide compound. The most common sacrificial electrodes utilized in such apparatus are made of iron or aluminum, the most common non-sacrificial electrodes being made of carbon.

Present electrocoagulation art does not adequately address the mechanisms of flotation, sedimentation and the circulation effect of coagulant aggregation in the early stages as bridging flocs. In the electrocoagulation process, the partially lighter aggregated coagulants are transported to the liquid surface by their attachment onto the ascending electrolytic gas bubbles. The remaining, predominantly heavier, aggregated coagulants bridge to heavier, larger flocs and precipitate out into a sediment layer.

Treatment analysis in advance of establishment of the treatment regimen determines the necessary mass quantity of matter that needs to be deposited by the sacrificial electrodes. For diagnostic real time capability, the electrocoagulation reactor described hereinafter may be equipped with selective multiple electrolytic cell choices (14 cells, for example) in the primary reactor chamber.

In accordance with this aspect of the invention, the following relates to electrical apparatus for electrolytic flotation and electrochemical dosing referred to as electrocoagulation, and apparatus, configurations and methods for treating contaminated waters for selective pre-treatment and/or cleaning of the waters. Electrocoagulation presents a cost-effective alternative to traditional methods for treatment of certain polluted waters or as a method for the pre-treatment of suspensions, emulsions and light sludges prior treatment with membrane technology, for instance clean up involving gas, dissolved and suspended solids removal from a hydraulic system where chemical or electrochemical dosing, coagulation, electroflotation, flocculation and sedimentation would be employed.

Apparatus 805 of this invention allows for a variety of electrode materials to be implemented within one active electrode plate area for numerous electrolytic treatment applications. The apparatus is compact and portable for easy delivery and hookup and is used in conjunction with the other apparatus for blending air, plasma-gas and/or dissolved metal salts with the feed water. As shown in FIG. 11, a plurality of pumps for controlling the feed water flow and a plurality of conveniently located valves, regulators and pump controls for automated or manual control of the various functions of the apparatus 805 are provided. Apparatus 805 is integrated directly with dissolved air flotation apparatus 806 in clarifier apparatus 809, and is further enhanced by integration with vacuum apparatus to accelerate the electroflotation of the floc-foam layer to the liquid surface of electrocoagulation reactor (together referred to herein as "electrolytic dissolved air flotation"—EDAF—treatment).

Also, in combination with membrane aerator 803, at high air flow rates apparatus 805 can be operated in a mode particularly useful for expediting coagulation of fine suspended solids that are otherwise difficult to precipitate out of suspension, particularly without use of chemical additives for enhancing the electrocoagulation process (especially useful with the non-sacrificial synthetic graphite electrodes disclosed herein). At lower flow rates, the combination enhances normal electrocoagulation processes. The diffused coagulating and disinfecting ions in the electrocoagulation process feed stream from apparatus 803 behaves similarly to many chemical additive treatments a polymers used in water treatment for solids removal.

The EDAF treatment approach utilizes a modified plate electrocoagulation reactor design. Because electrocoagulation reactor 805 is an integrated part of clarifier tank 2111 of lamella apparatus 809, shear-free sludge transfer in a compact single unit structure is provided. Vacuum enhanced electroflotation is provided through the employment of an enclosed vacuum hood 2117 above flotation chamber 2119 of flotation apparatus 806, to speed up the flotation process and as well remove unwanted created or entrained gases via vacuum degassing apparatus 808.

Vacuum hood 2117 is adjustable for proximity and vacuum lift capability to optimize the electroflotation effect as well as floc-foam surface layer removal at cyclone separator apparatus 807. Hood 2117 is mounted on outer housing 2121 holding inner reactor assembly 2123 of electrocoagulation apparatus 805. Inner assembly 2123 is defined by four corner posts 2125 (FIG. 13) together establishing primary reaction chamber 2127 and secondary reaction chambers 2129 and 2131 adjacent the primary chamber. The secondary chambers provide additional electrocoagulation treatment stages to optimize the overall electrocoagulation treatment on an as needed basis. Each secondary chamber includes an anode, cathode and bipolar electrode 2133, 2135 and 2137, respectively, held in corner post 2139 for insulating the secondary chambers as well as forming supports for insulating walls 2141 of the primary chamber. A small jet of previously clarified process water received through conduits 2142 washes electrode 2137

Conical sludge chamber 2143 is formed below primary reaction chamber 2127 and vacuum/flotation chamber 2119 of flotation apparatus 806 is formed below chamber 2127. Primary electrode plates (either sacrificial or, preferably, non-sacrificial) are held at a plurality of electrode positioners 2145 at opposed chamber walls. This electrode framework allows rapid electrode interchangeability and/or electrode set ups specially adapted to site circumstances. For example, a composite electrode setup with electrodes of different materials combined within a single electrode stack could be utilized for treatment of complex feed waters. Bipolar electrodes 2137 of secondary chambers 2129 and 2131 are readily accessible for maintenance purposes.

Integrated sludge chamber 2143 provides buoyancy and/or electromechanically actuated sludge transfer via a sludge cone valve 2149. Sludge is transferred from sludge chamber 2143 into the fluid bed of the sludge holding/disposal chamber 810 at lamella clarifier tank 2111 of clarifier apparatus 809, thus minimizing a shear introducing gradient to the delicate floc structure within the sedimentated electrocoagulation sludge. This eliminates or greatly reduces the need for expensive floc polymers and/or coagulants as well as reducing energy requirements for the floc rebuilding process. A compound sludge chamber angle of repose of 35° for hydroxide sludge is employed thus, in conjunction with a matching sludge cone release valve, preventing sludge build up within the chamber and expediting sludge release.

A variable discharge head and distribution system may be employed to minimize surface floc-foam layer carry over from the primary chamber and provide suitable discharge distribution geometry into secondary electrocoagulation chamber(s), thus minimizing channeling and ensuring effective electrocoagulation treatment in the secondary electrocoagulation. Secondary electrocoagulation flow control may be provided through discharge disks and dampener adjustment to ascertain proper flow distribution, retention time and minimize channeling, providing an effective secondary and efficient overall electrocoagulation treatment.

Multiple flat bar electrodes 2203 forming multiple electrode stacks 2205 (only one shown in FIG. 12) are employed. These standard vertical stacks consist of electrode bars 2203 arranged one on top of another. Horizontal stacks 2205 may be arranged with electrode bars 2203 in a side by side arrangement (instead on atop one another) and secured by a top contactor clip which also provides current transfer from one stack 2205 to the next. The vertical multi-flat bar stack 2205 arrangement is more suitable to maximize sacrificial electrode life. The sacrifice of electrode material is more pronounced on the leading edge/area of the ascending feed water flow in a downward or upward directed parabolic shape. The leading edge problem can be minimized by substituting the bottom bar with a nonmetallic, but conductive graphite bar. If unacceptable, a new sacrificial bottom bar needs to be added from time to time between whole stack replacements.

The vertical multi-flat bar option provides a mechanism for active electrode area reduction without sacrificing reactor retention time by insertion of dielectric/nonconductive plate area (PVC or CPVC) into the vertical stack electrode structure in place of active electrode bar(s). This allows varying of the active surface area to volume ratio to find the optimum ratio for a particular application. This variable ratio option is an important feature in establishing scale-up of this parameter.

Required electrical field strength (dependent upon concentration levels and contaminant types in the feed water) can be manipulated by varying electrode C—C spacing for treatment optimization. Primary electrocoagulation facilities at 2127 are powered with a variably applied amperage in the range of 0.1 to 60 amps. With electrode bars set in series connection mode, the same current flows through all the electrodes and voltage is allowed to vary as electrocoagulation treatment progresses over time.

A crossflow electrode flushing capability option through valve 2151 is preferably provided to create a turbulent flow regime with the ascending water flow in primary electrocoagulation reactor chamber 2127 and with the descending flow within the secondary electrocoagulation reactor chambers 2129 and 2131. Flow direction of flush water jetting is staggered crosswise and perpendicular to the electrocoagulation process water flow over the electrode plates. The directed turbulent flow continually washes the sides of the electrodes and prevents or significantly retards the build-up of impermeable oxide layers (passive) on the cathode as well as deterioration of the anode due to oxidation. This can be done instead of polarity switching or, in a fine regulated mode, in addition to polarity switching in severe scaling situations or in applications that contain heavy amounts of grease or oils.

A small jet of previously clarified and pressurized process water flow is constantly or time sequentially introduced into the electrocoagulation process water flow through a plurality small ($1/32$", for example) holes drilled into electrode positioners 2145 at primary electrocoagulation reactor chamber 2127. Secondary electrocoagulation reactor chambers 2129 and 2131 have a plurality of similar holes 2142 drilled into spaces at insulating corner post 2139 between and close to the electrodes.

The three phase separation and removal areas of electrocoagulation reactor apparatus 805 operates as a standard parallel electrode unit (in a fluidized bed configuration a different arrangement would be applied). In phase one, light flotation solids in the floc-foam, gas ($H_2$ and $O_2$), and oil and grease layers are separated at the liquid surface and removed by the adjustable vacuum at vacuum chamber 2119. In phase two, the semi-clarified effluent of the primary electrocoagulation treated water is separated from underneath the floc-foam surface layer at chamber 2127 and is removed or transferred through adjustable disk head control devices into the secondary electrocoagulation reactor chambers 2129/2131. It is here either optionally treated or directly discharged into the settling portion of the lamella clarifier tank 2111 to develop clarity prior to discharge from the lamella separator 2115 overflow into the clear flow catch tank 2113. In phase 3, the solids precipitate out into integrated primary electrocoagulation sludge chamber 2143, proceeding through the normal sedimentation process mechanics.

When operating electrocoagulation apparatus 805 with non-sacrificial electrodes, for instances with electrically conductive synthetic graphite electrodes, the necessary positively charged ions for maintaining the electrocoagulation process are partially provided by the feed water itself. The remaining part of the required positively charged ions are added in form of metallic ions such as $Al+$, $Ca+$, $Fe+$ and $Mg+$ salts. For an enhanced electron migration, the electrocoagulation process should be operated within the acidic range through chemical dosing with hydrochloric (HCl), sulfuric ($HS_2O_4$) or phosphoric acid ($H_3PO_4$). Utilization of synthetic graphite electrodes avoids the consumption, replacement and operating down-time associated with conventional sacrificial electrodes, and reduces energy and maintenance costs. Moreover, metallic salts are less expensive than the refined, finished, sawcut and otherwise machined or fabricated sacrificial metal electrode plates.

To facilitate feed into chamber 2127, a longitudinal tube turns for net feed area adjustment inside of the stationary $1\frac{1}{4}$" base pipe, a defined net opening slot area distributing the whole feed through the whole length of primary electrocoagulation reactor chamber 2127. To facilitate discharge from inner reactor assembly 2123, discharge weir disk orifices are preferably provided for flow control from chamber 2127 or into secondary chambers 2129 and/or 2131. To prevent surface foam carry over into the secondary electrocoagulation treatment chambers, a positive head above the center of these orifices needs to be maintained at all times.

Through simple contact plunger manipulation at an easily accessible multinode terminal bar or bars adjacent the electrodes (either manual or automated contact manipulation could be deployed), electrocoagulation reactor operating circuitry can be arranged for different modes of operation. For parallel operation, contact plungers are provided at each electrode node at a terminal bar. This arrangement of the electrocoagulation reactor circuitry provides parallel connection using monopolar electrodes. In this mode, the electric current is divided between all of the electrodes in relation to the resistance of the individual cells. The same voltage is present in all of the contact plungers. Varying the current controls the rate of electrochemical activity For series operation, one contact plunger remains active at the terminal bar furthest from the source power connections. Insulated jumpers connect the nodes. In this mode of operation the contactor terminal bar provides series connection for the monopolar electrodes in the electrocoagulation reactor. In series cell arrangements, a higher potential difference is required for a given current to flow, because of higher cumulative resistance. The same current would, however, flow through all the electrodes. Varying the voltage controls the rate of electrochemical activity.

In a parallel, bipolar configuration (as shown in the secondary chambers 2129 and 2131, but which could be applied primarily), one contact plunger at both contactor terminal bars remains, the one furthest from the source power connections. Only the monopolar anode and cathode electrodes are connected to the electrical power connections. In this mode, bipolar electrodes with cells in parallel are used. The bipolar electrodes are placed between the two parallel anode/cathode electrodes without any electrical connections. When an electric current is passed through the two electrodes, the neutral sides of the conductive plate of the bipolar electrodes will be transformed to charged sides, which have opposite charge compared to the parallel side beside it. This cell arrangement provides, where applicable, a desirable testing platform for a full scale unit application. Its simple set-up and maintenance can lower the overall electrocoagulation operating cost.

A mixed parallel and series configuration could be provided, providing individual mixed cell circuitry configurations. For instance, in a fourteen cell reactor, half the cells could be connected in a series circuitry and the remaining seven cells connected in parallel, either as monopolar, bipolar or in mixed mode. This option can be used as a diagnostic tool when different amperages are needed for different electrode materials within the primary electrocoagulation reactor for specific treatment situations.

These parallel or series power connection choices are implemented by spring loaded contactor bars with integrated connection interchangeability (plungers). DC or AC operating power options with variable current density controls are implementable for control of electrochemical dosing and electrolytic bubble density production for sacrificial electrodes, as well as regulating the required transport current for the required added positively charged ions when nonmetallic and non-sacrificial electrodes are employed.

Controlled polarity switching for DC power implementations is provided to prevent or minimize oxide build up as well as hydrogen polarization. A vector frequency controller for the AC power option provides for frequency control below 60 Hertz to prevent disaggregation of agglomerated particles. To accommodate rapid changes of electrodes and/or customization of electrode setups, main power distribution through removable, quick release, swing away main contactor bars, providing as well for rapid change from parallel to series power connection, is utilized.

Regarding pre-treatment suite stages 411 and 413, zeta potential is an important part of the electrokinetic phenomena of interaction between particles in suspension. The zeta potential is the electrokinetic potential of a suspended particle as determined by its electrophoretic mobility. This electric potential causes colloidal particles to repel each other and stay in suspension. The zeta potential is a measurement of the overall charge characteristic of the suspended particles in the water. The kind and magnitude of the electrical charge depends on the surface potential of the particles, or the zeta potential. A negative zeta potential indicates that the water contains free negatively charged suspended solids (common in many treatment feed waters) that are stabilized and therefore more likely to stay in solution.

A neutral zeta potential indicates that the suspended solids do not carry a charge to assist in their electrical repulsion of each other. They are more likely to destabilize and coagulate into larger particulate groups and fall out of solution, and therefore being removed as part of the pre-treatment. The importance of the zeta potential rests on the fact that it can be measured experimentally and in many cases serves as a good approximation of the unmeasurable surface potential of the colloidal particle, since there is a fairly immobile layer of counter ions that sticks tightly to the surface of the particle. Treatment diagnostics herein thus uses the zeta potential measurement to gauge coagulant requirements (if any), and can be adapted for automated adjustment of an injected cationic (positively charged) coagulant such as reverse osmosis Quest 6000, which could be used in pre-treatment stage 411, to achieve a neutral zeta potential upstream of pre-treatment stage 413. Thus utilized, suspended solids would be more likely to fall out of solution into 2111 of clarifier 809.

Vacuum introduced cyclone separation apparatus 807 of suite 413 (FIG. 11) utilizes a conventional cyclone unit or units 2155 and 2157 connected for vacuum inducement apparatus 808 and hood 2119 and outlet for foam collection through filters 2159 and 2161, respectively. Filtration stage 415 (step 7) makes use conventional know bag filter systems 2105 and or belt filtration systems 2107 (such as the Roll-A-Filter or Lazy Filter fabric media systems produced by SERFILCO. Homogenizing and buffer tank for pH and chemical adjustment a stage 417 (step 8), and buffer tanks at stages 425 and 431 (steps 12 and 15), make use of a standard, commercially available tank designs (for example, polyethelene tanks by LMI or SNYDER of adequate capacity, and with or without containment basins). Chemical metering pumps 306, 308 and the pumps used at stages 421 and 427 (steps 10 and 13) could be either of two types (automated and/or manually operated). Primary chemical injection pumps are solenoid-driven, dual manual controlled diaphragm metering pumps having four-function valves for control of anti-siphon, back pressure, priming, and pressure relief all in one could be used (the metering pumps and controls by LMI Milton Roy, for Example).

Secondary chemical injection pumping employs dual channel peristaltic pumps for antiscalant injection, for example upstream of nanofiltration and reverse osmosis membrane systems described below (V-TECH—3000 at stage 421 or 4000 at stage 427—through Masterflex pumps from Cole-Parmer Instrument Company, for example, could be utilized).

In FIG. 14, control functions of the plurality of treatment apparatus of first and second pre-treatment suite stages 411 and 413 are illustrated. Each choice allows omission of the immediately following treatment apparatus step and choice.

As may be appreciated from the foregoing apparatus and methods for combining electrocoagulation and membrane aeration treatment stages in an effluent treatment array is provided by this invention. The overall apparatus presents a unified installation, reducing maintenance floor space requirements, and which is designed for co-extensive utilization of components and efficient, durable operation.

What is claimed is:

1. An effluent treatment array utilizing enhanced membrane aeration for enhanced electrocoagulation treatment of effluent comprising:
   an ionized air/gas generator for establishing an ion rich air/gas stream;
   a membrane aerator receiving said air/gas stream and effluent to be treated and providing an outflowing ionized air/gas rich effluent feed stream having said ionized air/gas diffused thereinto; and
   an electrocoagulation processing assembly receiving said ionized air/gas rich effluent feed stream for electrocoagulation treatment thereof and having an output therefrom.

2. The array of claim 1 wherein said electrocoagulation processing assembly includes a primary reactor chamber and a floatation chamber integral with said reactor chamber, a vacuum hood attached at the upper portion thereof and having a vacuum means for applying a vacuum through said hood to said floatation chamber.

3. The array of claim 2 wherein said electrocoagulation treatment assembly includes at least one secondary reactor chamber for receiving partially treated effluent at said output from said primary reactor chamber, said secondary reactor chamber having a treated effluent outlet.

4. The array of claim 1 further comprising a monitoring unit for monitoring gas bubble formation at said membrane.

5. The array of claim 1 wherein said ionized air/gas generator includes one of either a UV unit or a particle emitter.

6. The array of claim 5 wherein said UV unit is a VUV/UV unit and said particle emitter is polonium origin particle emitter.

7. The array of claim 1 wherein said membrane aerator is one of a single or double coil aerator assembly.

8. An effluent treatment array utilizing enhanced membrane aeration for enhanced electrocoagulation treatment of effluent comprising:

a particle emitter for establishing an ion rich air/gas stream;

a membrane aerator including an electrically charged dual coil mixing system for receiving said air/gas stream and effluent to be treated and providing an outflowing ionized air/gas rich effluent feed stream having said ionized air/gas diffused thereinto;

an electrocoagulation processing assembly including a primary reactor chamber and a floatation chamber integral with an upper part of said reactor chamber for receiving said ionized air/gas rich effluent feed stream for enhanced electrocoagulation treatment thereof and having an output therefrom; and a vacuum hood attached at an upper portion of said electrocoagulation processing assembly for vacuum assisted removal of lighter than water contaminants ascending from said effluent.

9. The array of claim 8 wherein said membrane aerator includes a clear reactor sight glass outer body.

10. The array of claim 8 wherein said dual coils mixing system of said membrane aerator includes first and second electrically isolated coils twisted around a membrane and mounted in a grooved support body.

11. The array of claim 10 wherein said dual coils have an even pitch spacing and have an AC power linkage at one part thereof.

12. The array of claim 8 wherein said membrane aerator includes an outer body and a support body, said support body defining an expansion chamber for receipt of said ionized air/gas stream, a membrane mounted on said support body.

13. The array of claim 12 wherein said support body has a plurality of slots formed therearound for open access from said expansion chamber to said membrane.

14. An effluent treatment array utilizing enhanced membrane aeration for enhanced electrocoagulation treatment of wastewater, said apparatus comprising:

an ionized air/gas generator for establishing an ion rich air/gas stream;

a membrane diffuser for diffusing said ion rich air/gas stream into a flow of the wastewater to provide an ionized air/gas rich effluent feed stream; and an electrocoagulation processing assembly for exposing said feed stream to primary electrocoagulation processing.

15. The array of claim 14 further comprising a vacuum processor above said electrocoagulation processing assembly to assist removal of lighter than water contaminants ascending from said effluent during electrocoagulation processing.

16. The array of claim 14 wherein said ionized air/gas generator includes a UV emitter.

17. The array of claim 14 wherein said ionized air/gas generator includes a polonium origin particle emitter.

18. The array of claim 14 wherein said electrocoagulation processing assembly includes a secondary electrocoagulation processing stage adjacent to said primary electrocoagulation processing.

* * * * *